(12) United States Patent
Edenholm

(10) Patent No.: US 11,466,658 B2
(45) Date of Patent: *Oct. 11, 2022

(54) FLUID FLOW ACTUATED TOOL

(71) Applicant: Erik Edenholm, Cortlandt Manor, NY (US)

(72) Inventor: Erik Edenholm, Cortlandt Manor, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/019,487

(22) Filed: Sep. 14, 2020

(65) Prior Publication Data

US 2020/0408185 A1    Dec. 31, 2020

Related U.S. Application Data

(63) Continuation of application No. 15/864,669, filed on Jan. 8, 2018, now Pat. No. 10,808,674.

(Continued)

(51) Int. Cl.

| *F03B 13/04* | (2006.01) |
|---|---|
| *B05B 9/01* | (2006.01) |
| *A47L 15/00* | (2006.01) |
| *B60S 3/04* | (2006.01) |
| *B08B 1/00* | (2006.01) |

(Continued)

(52) U.S. Cl.
CPC ............... *F03B 13/04* (2013.01); *A46B 7/04* (2013.01); *A46B 9/025* (2013.01); *A46B 11/063* (2013.01); *A46B 13/001* (2013.01); *A46B 13/06* (2013.01); *A47L 15/0065* (2013.01); *B05B 3/0463* (2013.01); *B05B 9/01* (2013.01); *B08B 1/002* (2013.01); *B08B 1/04* (2013.01); *B08B 3/02* (2013.01); *B60S 3/048* (2013.01); *F03B 7/00* (2013.01); *F03B 11/025* (2013.01); *F03B 13/00* (2013.01); *A46B 2200/3006* (2013.01); *A46B 2200/3033* (2013.01); *A46B 2200/3046* (2013.01); *B05B 15/652* (2018.02); *B60S 3/042* (2013.01); *F05B 2220/602* (2013.01); *F05B 2250/82* (2013.01); *Y02B 10/50* (2013.01); *Y02E 10/20* (2013.01)

(58) Field of Classification Search
CPC .......... F03B 13/04; F03B 7/00; F03B 11/025; F03B 13/00; F03B 3/12; F03B 3/121; B05B 9/01; B05B 3/0463; B05B 15/652; A47L 15/0065; B60S 3/048; B60S 3/042; B08B 1/002; B08B 1/04; B08B 3/02; A46B 7/04; A46B 9/025; A46B 11/063; A46B 13/001; A46B 13/06; A46B 2200/3046; A46B 2200/3006; A46B 2200/3033; Y02B 10/50; F05B 2250/82; F05B 2220/602; Y02E 10/226

See application file for complete search history.

(56) References Cited

U.S. PATENT DOCUMENTS 2,540,240 A * 2/1951 Boyle ............... A46B 13/06 15/29
10,808,674 B2 * 10/2020 Edenholm ........... A47L 15/0065

* cited by examiner

*Primary Examiner* — Steven M Cernoch
(74) *Attorney, Agent, or Firm* — McGlew and Tuttle, P.C.

(57) ABSTRACT

A fluid flow actuated tool including a housing, a tool and an actuating mechanism. The housing includes a housing interior. The housing interior receives a flow of fluid. The actuating mechanism includes a fluid wheel structure. The fluid wheel structure is connected to the tool. At least a portion of the fluid wheel structure is arranged in the flow of fluid for rotating the fluid wheel structure. The tool is actuated based on rotation of the fluid wheel structure.

15 Claims, 24 Drawing Sheets

Related U.S. Application Data

(60) Provisional application No. 62/444,041, filed on Jan. 9, 2017.

(51) Int. Cl.
| | |
|---|---|
| *B08B 1/04* | (2006.01) |
| *B08B 3/02* | (2006.01) |
| *A46B 7/04* | (2006.01) |
| *A46B 9/02* | (2006.01) |
| *A46B 11/06* | (2006.01) |
| *A46B 13/00* | (2006.01) |
| *A46B 13/06* | (2006.01) |
| *F03B 7/00* | (2006.01) |
| *F03B 11/02* | (2006.01) |
| *B05B 3/04* | (2006.01) |
| *F03B 13/00* | (2006.01) |
| *B05B 15/652* | (2018.01) |

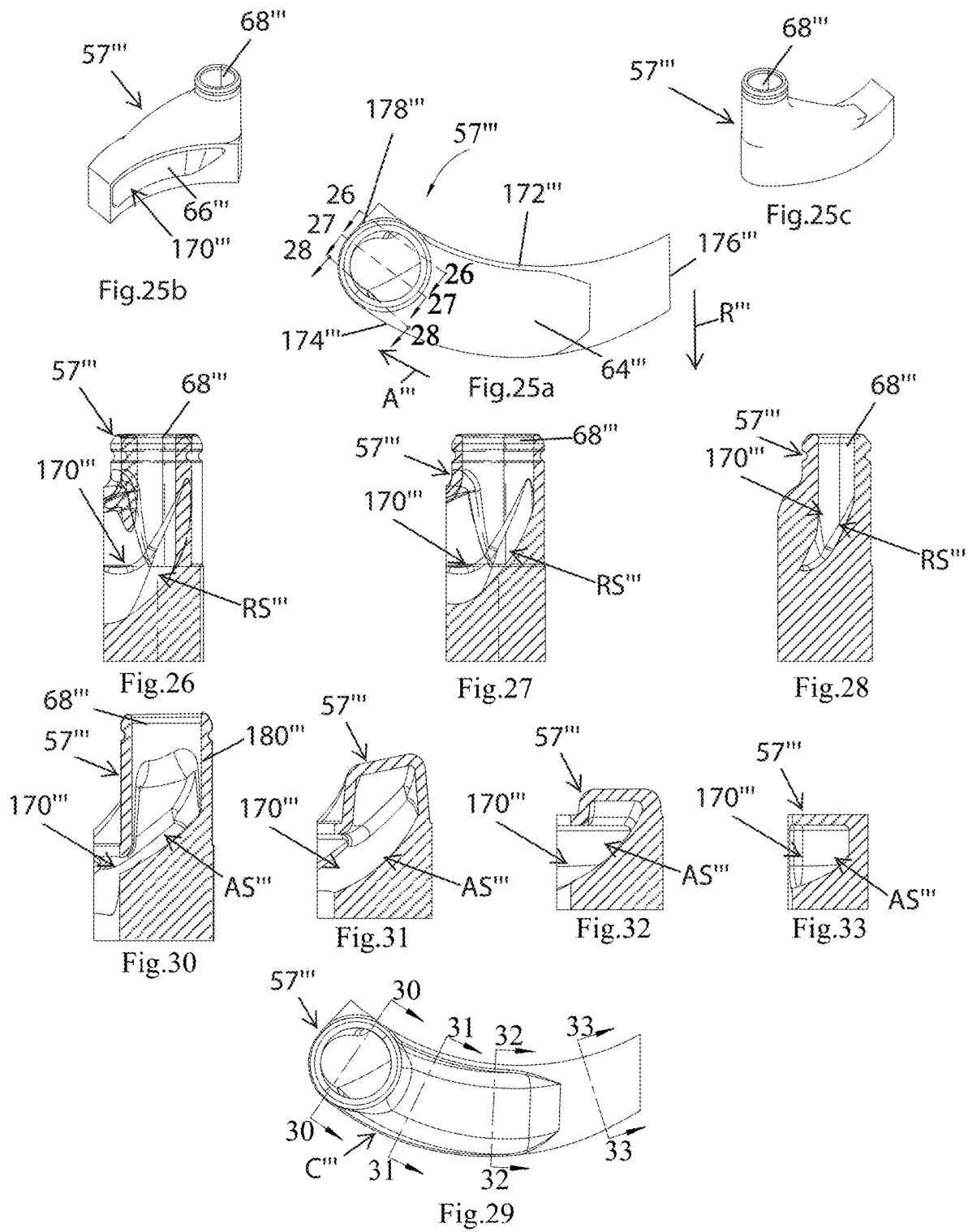

FLUID FLOW ACTUATED TOOL

CROSS REFERENCE TO RELATED APPLICATIONS

This application is a continuation under 37 CFR 1.53(b) of prior U.S. patent application Ser. No. 15/864,669 filed Jan. 8, 2018 and claims the benefit the benefit of priority of U.S. provisional application 62/444,041 filed Jan. 9, 2017, the entire contents of each application are incorporated herein by reference.

FIELD OF THE INVENTION

The present invention relates to a fluid flow actuated tool.

BACKGROUND OF THE INVENTION

Conventional tools, such as brushes, are difficult for a user to grasp, particularly for people who have arthritis and elderly people who do not have the hand strength to hold and operate such tools. This disadvantageously allows a user to improperly use the tool such that the tool does not adequately perform its function, such as using a brush to clean a rim of a tire or using the brush to wash dishes. Further, such tools are manually operated by the user, which requires great effort on the part of the user.

SUMMARY OF THE INVENTION

The present invention relates to a fluid flow actuated tool that can be easily grasped by a user such that the user can operate the tool in an efficient manner. As the tool is actuated by fluid, minimal effort is exerted by the user in operating the tool. The tool is lightweight and can be held by a single hand of the user, which makes the tool easy to maneuver and manipulate when operating the tool.

According to the present invention, the fluid flow actuated tool comprises a housing, a tool and an actuating mechanism. The housing comprises a housing interior. The housing interior receives a flow of fluid. The actuating mechanism comprises a fluid (water) wheel structure. The water wheel structure is connected to the tool. At least a portion of the water wheel structure is arranged in the flow of fluid for rotating the water wheel structure. The tool is actuated based on rotation of the water wheel structure.

The actuating mechanism may be arranged in the housing interior.

The water wheel structure may comprise a plurality of fluid engaging structures. Each of the fluid engaging structures may comprise fluid engaging material. The fluid engaging material may comprise a plurality of fluid engaging conical portions for engaging the flow of fluid.

Each of the fluid engaging structures may comprise a first portion and a second portion extending in a radial direction with respect to a longitudinal axis of the water wheel structure. Each of the fluid engaging structures may further comprise a third portion and a fourth portion extending in an axial direction with respect to the longitudinal axis of the water wheel structure. The first portion may be parallel to the second portion. The third portion may be parallel to the fourth portion.

The tool may comprise a tool shaft. The housing may comprise a tool shaft receiving opening. At least a portion of the tool shaft may be arranged in the tool shaft receiving opening.

The housing may comprise a housing fluid guide member having an opening facing in a direction of the tool shaft. The housing fluid guide member may convey fluid from the interior of the housing to an environment external to the housing in a direction of the tool shaft.

The housing may comprise another housing fluid guide member having an opening facing in the direction of the tool shaft. The another housing fluid guide member may convey the fluid from the interior of the housing to the environment external to the housing in the direction of the tool shaft.

The housing may comprise a housing opening located at a radially spaced location from the tool shaft. The fluid may flow from the interior of the housing to the environment external to the housing via the opening.

The housing may comprise a housing connector for connecting the housing to a fluid supply line for supplying the flow of fluid to the interior of the housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 25a is a top view of a fluid guide member;

FIG. 25b is a front perspective view of the fluid guide member of FIG. 25a;

FIG. 25c is a rear perspective view of the fluid guide member of FIG. 25a;

FIG. 26 is a cross sectional view of the fluid guide member of FIG. 25;

FIG. 27 is a cross sectional view of the fluid guide member of FIG. 25;

FIG. 28 is a cross sectional view of the fluid guide member of FIG. 25;

FIG. 29 is another top view of the fluid guide member of FIG. 25;

FIG. 30 is a cross sectional view of the fluid guide member of FIG. 29;

FIG. 31 is a cross sectional view of the fluid guide member of FIG. 29;

FIG. 32 is a cross sectional view of the fluid guide member of FIG. 29;

FIG. 33 is a cross sectional view of the fluid guide member of FIG. 29;

DESCRIPTION OF THE PREFERRED EMBODIMENTS

Figure 1:
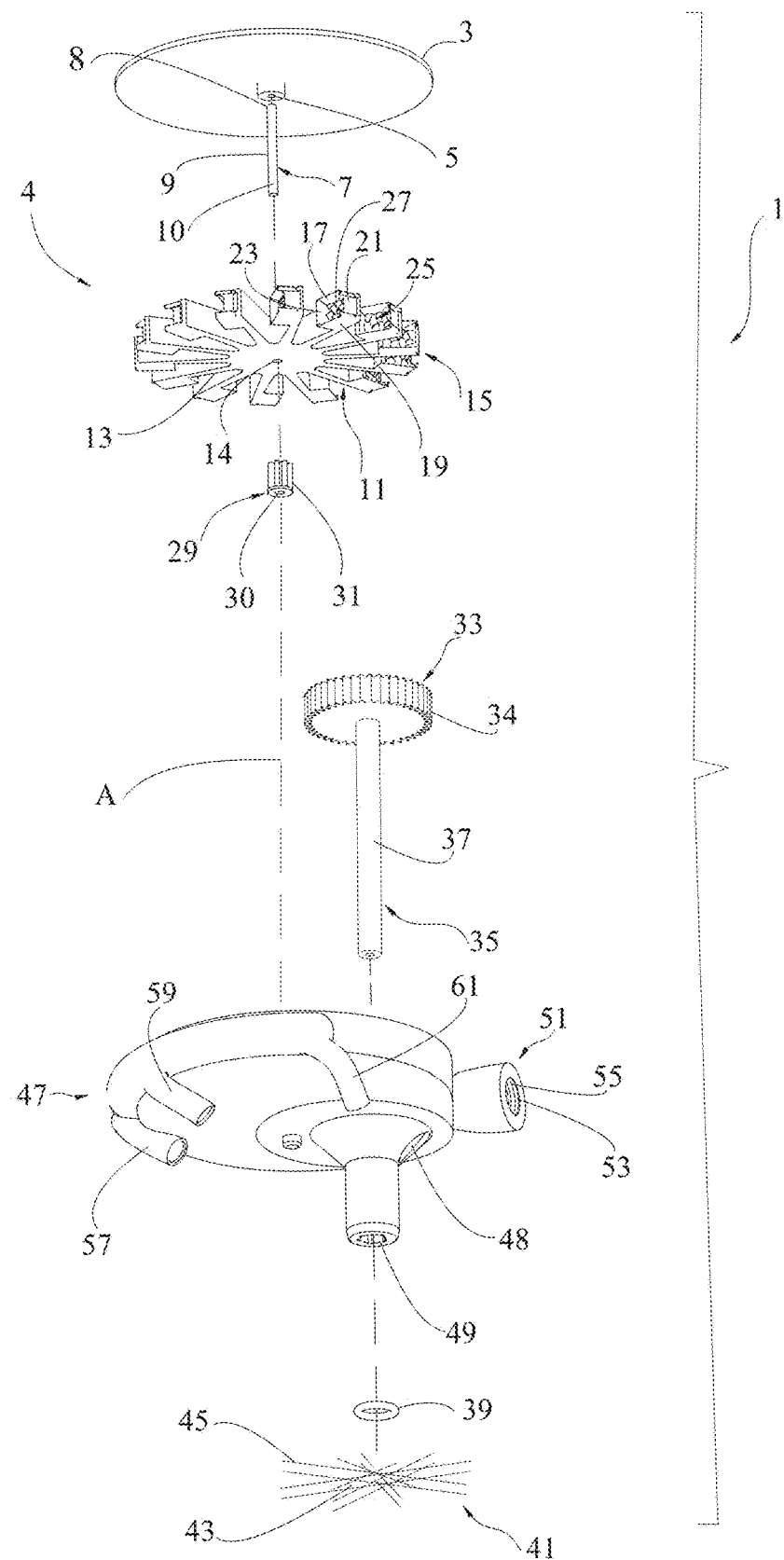
FIG. 1 is an exploded view of a fluid flow actuated tool.

Referring to the drawings in particular, FIG. 1 is an exploded view of a fluid flow actuated tool 1. The fluid flow actuated tool 1 includes a housing cover 3 and an actuating mechanism 4. The housing cover 3 has an opening 5. The actuating mechanism 4 includes a water wheel and gear mounting member 7 that is connected to the housing cover 3. The water wheel and gear mounting member 7 includes a shaft 9. An end portion 8 of the shaft 9 is inserted in the opening 5. The actuating mechanism 4 includes a fluid (water) wheel structure 11 that is connected to the shaft 9. The water wheel structure 11 has a plurality of water wheel members 13 (only one of the water wheel members 13 is designated in the drawings in order to prevent overcrowding in the drawings). Each of the water wheel members 13 extends in a radial direction with respect to a longitudinal direction A of the fluid flow actuated tool 1. The water wheel structure 11 has an opening 14. The shaft 9 passes through the opening 14 to connect the water wheel structure 11 to the shaft 9.

The water wheel structure 11 has a plurality of water wheel fluid engaging structures 15 (only one of the water wheel fluid engaging structures 15 is designated in the drawings in order to prevent overcrowding in the drawings). Each of the water wheel fluid engaging structures 15 includes a first radially extending water wheel fluid engaging portion 17 (extending in a radial direction with respect to the longitudinal direction A of the fluid flow actuated tool 1), a second radially extending water wheel fluid engaging portion 19, which is parallel to the first radially extending water wheel fluid engaging portion 17 (extending in the radial direction with respect to the longitudinal direction A of the fluid flow actuated tool 1), a first axially extending water wheel fluid engaging portion 21 (extending in an axial direction with respect to the longitudinal direction A of the fluid flow actuated tool 1), a second axially extending water wheel fluid engaging portion 23 (extending in the axial direction with respect to the longitudinal direction A of the fluid flow actuated tool 1), which is parallel to the first axially extending water wheel fluid engaging portion 21, and fluid engaging material 25 that is arranged between the first radially extending water wheel fluid engaging portion 17, the second radially extending water wheel fluid engaging portion 19, the first axially extending water wheel fluid engaging portion 21 and the second axially extending water wheel fluid engaging portion 23. The height of the fluid engaging material 25 is less than the height of each of the first radially extending water wheel fluid engaging portion 17, the second radially extending water wheel fluid engaging portion 19, the first axially extending water wheel fluid engaging portion 21 and the second axially extending water wheel fluid engaging portion 23. The fluid engaging material 25 has a plurality of fluid engaging material portions 27 (only one of the fluid engaging material portions 27 is designated in the drawings to avoid overcrowding of the drawings). Each of the fluid engaging material portions 27 are shown in the drawings as being conically shaped, however, it is understood that the fluid engaging material portions 27 could have any suitable shape, but it has been discovered that the conical shape of the fluid engaging material portions 27 provides an optimal surface for engaging and absorbing the force from a flow of fluid, which rotates the water wheel structure 11. The fluid engaging material portions 27 may be integrally formed with the water wheel structure 11 such that the fluid engaging material portions 27 are an extruded surface of the water wheel structure 11. The fluid engaging material portions 27 may be formed of the same material as the material of the water wheel structure 11, which may be any material, but plastic is preferred.

The actuating mechanism 4 includes a gear 29 that is connected to the shaft 9. The gear 29 has an opening 30 and a plurality of gear teeth 31. The gear 29 is fixed to the water wheel structure 11. At least a portion of the shaft 9 extends through the opening 30 to connect the shaft 9 to the gear 29.

The actuating mechanism 4 includes a gear 33 having gear teeth 34 that engage the gear teeth 31 of the gear 29. A tool connecting structure 35 is connected to the gear 33. One end of the tool connecting structure 35 may be welded to the gear 33 or connected to the gear 33 by any other suitable connection. The tool connecting structure 35 is shown in the form of a shaft 37. The shaft 37 is connected to a tool 41. In the example shown in the drawings, the tool 41 is in the form of a brush 43 that has a plurality of brush projecting members (brush bristles) 45, but it is understood that any other tool may be connected to the shaft 37, such as but not limited to a screw driver, a drill bit, a clamping member, etc.

The shaft 37 extends through an opening 49 in a housing 47. The housing cover 3 is detachably connected to the housing 47. Another end portion 10 of the shaft 9 is connected to the housing 47. The shaft 9, the water wheel structure 11, the gear 29 and the gear 33 are located in an interior space of the housing defined by the housing 47 and the housing cover 3 when the housing cover 3 is connected to the housing 47. The housing 47 has a housing opening 48 that is located at a radially spaced location from the shaft 37. At least a portion of the shaft 37 is located outside of the housing interior and a seal member 39 is arranged in the opening 49 to seal a space between the shaft 37 and the housing 47. The shaft 37 is located at a radially offset position from the longitudinal (center) axis of the fluid flow actuated tool 1.

Figure 10:
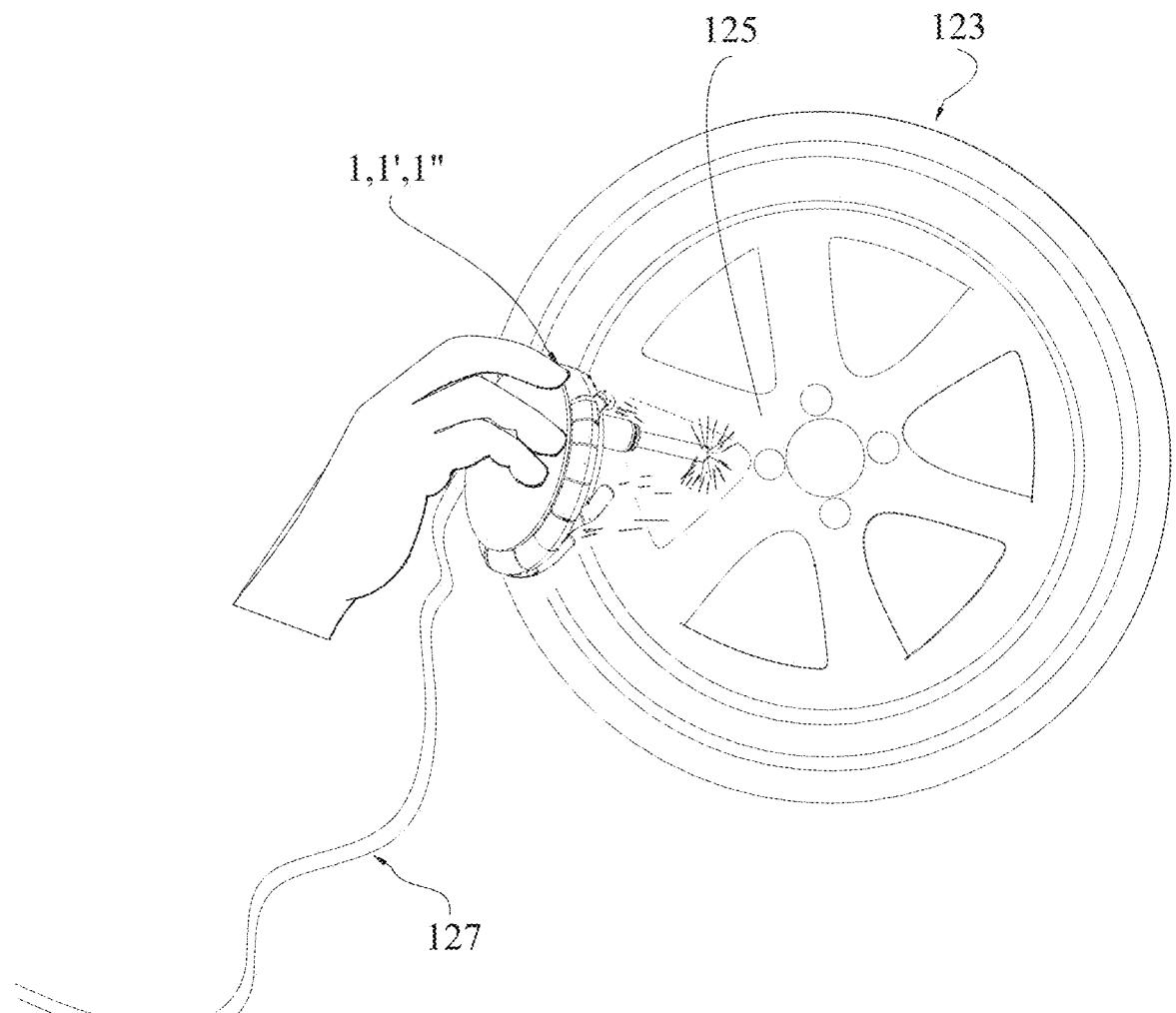
FIG. 10 is a view of the fluid flow actuated tool shown in FIG. 1, FIG. 6 and FIG. 7 applied to a tire rim of a vehicle.
Figure 11:
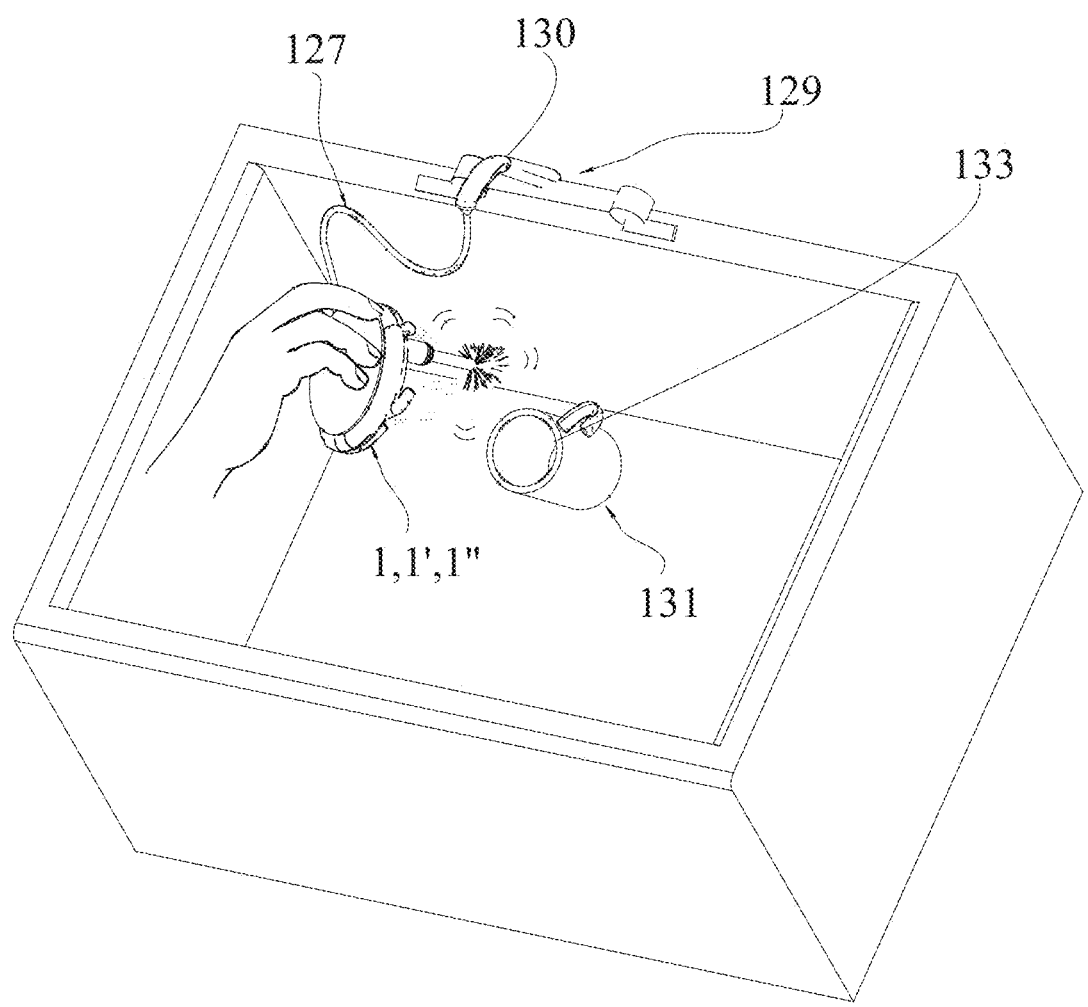
FIG. 11 is a perspective view of the fluid flow actuated tool shown in FIG. 1, FIG. 6 and FIG. 7 connected to a water faucet of a sink.

The housing 47 includes a housing connector 51 for connecting the housing 47 to a fluid supply line 127 such that the housing 47 receives a flow of fluid (see FIGS. 10 and 11). The housing connector 51 includes a housing connector opening 53 and a plurality of threads 55 for connecting to the fluid supply line 127. Although threads 55 are shown for connecting the housing 47 to the fluid supply line 127, it is understood that any other suitable connection may be used, such as a snap connection or a plug connection. One or more of the fluid engaging structures 15 and at least a portion of one or more of the water wheel members 13 are arranged in a path of expected flow of fluid prior to the flow of fluid entering the interior space of the housing 47. When the flow of fluid engages the fluid engaging material 25, the water wheel structure 11 rotates such that each of the fluid engaging structures 15 and at least a portion of each water wheel members 13 enters the path of the flow of fluid so that the water wheel structure 11 rotates as long as the fluid is supplied to the interior of the housing 47. The water wheel structure 11 and the gear 29 are fixed to the shaft 9. The wheel structure 11 and the gear 29 may be connected by any suitable means to the shaft 9, including using epoxy to connect the wheel structure 11 and the gear 29 to the shaft 9. The wheel structure 11 and the gear 29 may be integrally connected to the shaft 9 to form a one-piece structure, which may be done by molding or 3-D printing or any other suitable process. Rotation of the water wheel structure 11 via the flow of fluid causes the shaft 9 to rotate, which causes the gear 29 and the gear 34 to rotate such that the shaft 37 rotates, which causes the tool 41 to rotate. In another embodiment, a bearing may be connected to the water wheel structure 11 and the shaft 9 and another bearing may be connected to the shaft 9 and the gear 29 such that the shaft 9 remains in a fixed position as the water wheel structure 11, the gear 29 and the gear 34 rotate relative to the shaft 9.

When fluid enters the interior of the housing 47, the fluid flows out of the housing via the opening 48 and housing fluid guide members 57, 59, 61. Each of the housing fluid guide members 57, 59, 61 has an opening facing in a direction of the shaft 37 so that fluid is conveyed from the interior of the housing 47 to an area outside of the housing 47 in a direction of the shaft 37. This advantageously allows the fluid, which may be preferably water, to be used in whatever operation the fluid flow actuated tool 1 is being used for, such as using the fluid to clean with the tool 41.

Figure 2:
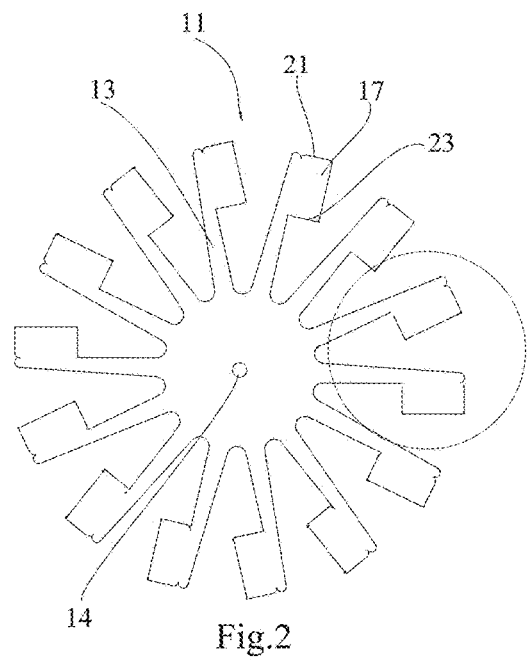
FIG. 2 is a side view of a water wheel structure that is used in each embodiment of the fluid flow actuated tool.

FIG. 2 is a side view of the water wheel structure 11. The features of the water wheel structure 11 are the same for each embodiment of the invention.

Figure 3:
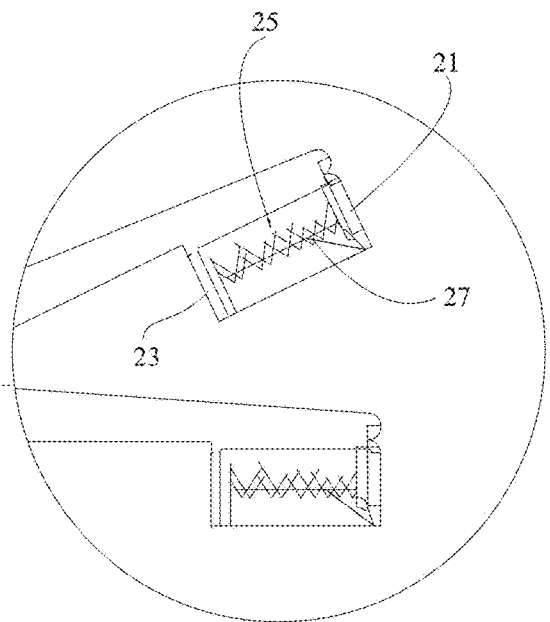
FIG. 3 is an enlarged side view of the water wheel structure of FIG. 2.

FIG. 3 is an enlarged side view of the water wheel structure of FIG. 2. FIG. 3 shows a side profile of the shape of the fluid engaging material portions 27.

Figure 4:
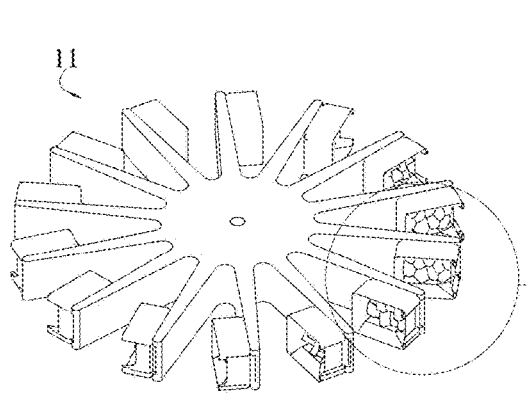
FIG. 4 is a perspective view of the water wheel structure of FIG. 2.

FIG. 4 is a perspective view of the water wheel structure 11 of FIG. 2.

Figure 5:
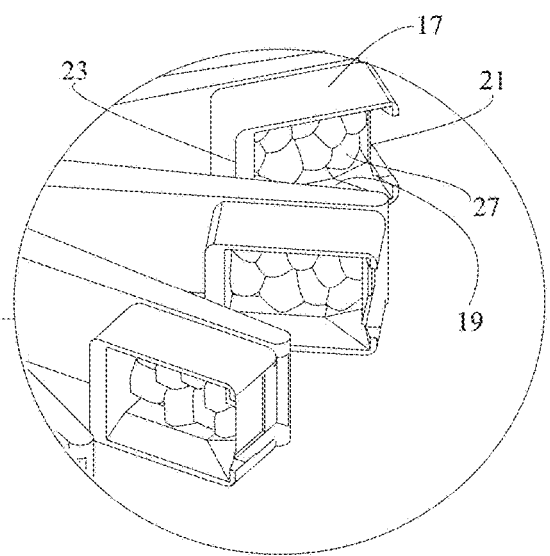
FIG. 5 is an enlarged perspective view of the water wheel structure of FIG. 2.

FIG. 5 is an enlarged perspective view of the water wheel structure 11 of FIG. 2 to more clearly show the conical shape of the fluid engaging material portions 27.

Figure 6:
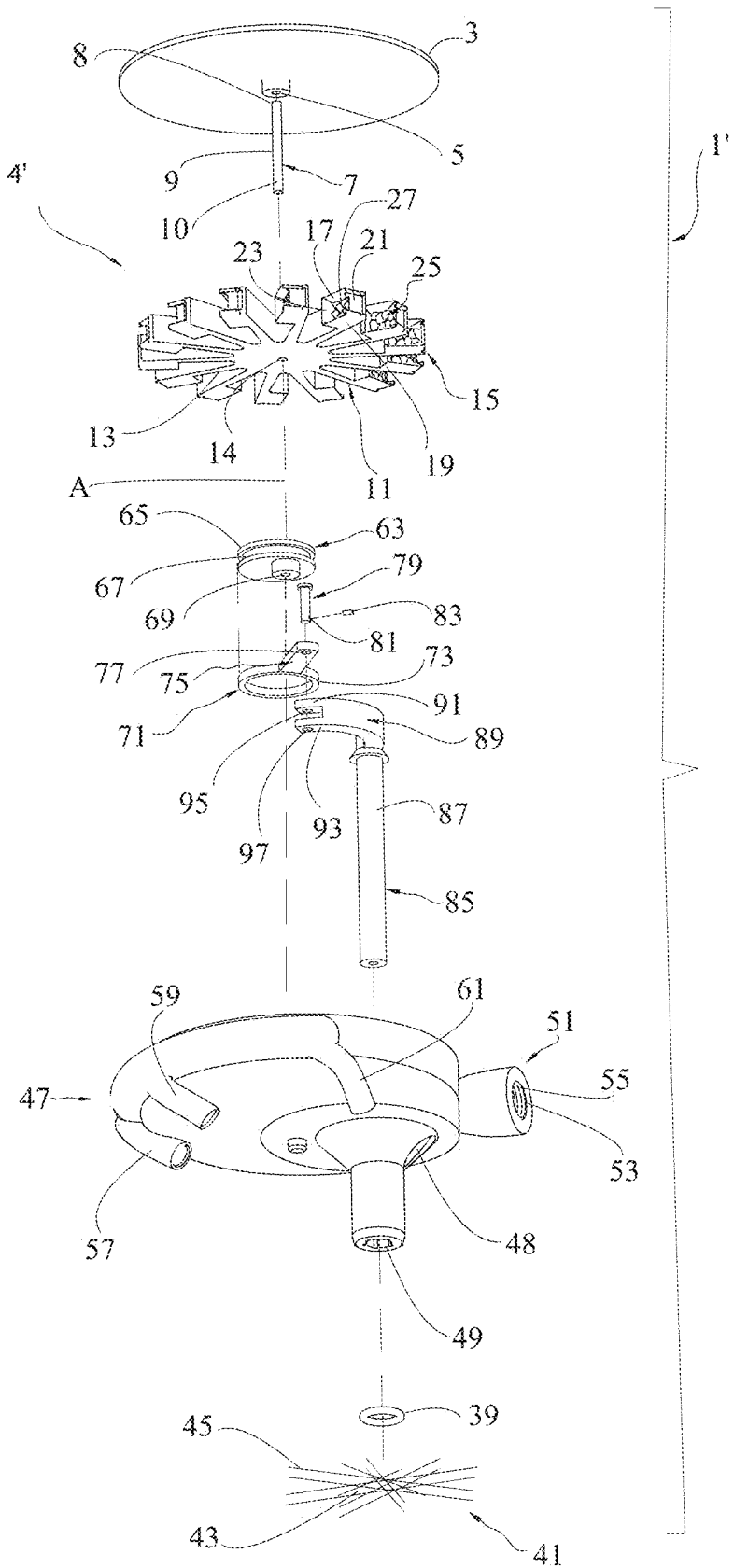
FIG. 6 is an exploded view of a fluid flow actuated tool with a different actuating mechanism than the fluid flow actuated tool of FIG. 1.

FIG. 6 is an exploded view of another embodiment of a fluid flow actuated tool 1'. The fluid flow actuated tool 1' is exactly the same as the fluid flow actuated tool 1, but the fluid flow actuated tool 1' has an actuating mechanism 4' that is different from the actuating mechanism 4 of the fluid flow actuated tool 1. Accordingly, the same reference characters are used to designate the same features shown in the previous embodiment. In order to avoid repetition, only the differences between the actuating mechanism 4 and the actuating mechanism 4' will be discussed.

Instead of the gears 29, 33 in the previous embodiment, the actuating mechanism 4' includes a transmission member 63 and a transmission member connecting member 71 that is connected to a connector member 89, which is connected to a tool connecting structure 85. The transmission member 63 includes an opening 69 and a cam 65 that has a slot 67. The transmission member 63 is fixed to the water wheel structure 11 and/or the shaft 9. A portion of the shaft 9 extends through the opening 69 to connect the cam 65 to the shaft 9. The transmission connecting member 71 includes an annular structure 73 and a projecting member 75 that extends radially with respect to the longitudinal axis A of the fluid flow actuated tool 1'. The annular structure 73 is inserted in the slot 67 to connect the annular structure to the cam 65. The projecting member 75 includes an opening 77. The tool connecting structure 85 includes a shaft 87, which extends through the opening 49 such that at least a portion of the shaft 87 is located outside of the housing 47. The shaft 87 is connected to the connector member 89. The connector member 89 has a first leg portion 91 and a second leg portion 93. The first leg portion 91 includes an opening 95 and the second leg portion includes an opening 97. A fastener 79 extends through the opening 77 in the projecting member 75, the opening 95 of the first leg 91 and the opening 97 of the second leg to connect the annular member 71 to the connector member 89. The fastener 79 includes an opening 81. The opening 81 receives at least a portion of a fastener 83 to fix the fastener 79 to the annular member 71 and the connector structure 89. When the flow of fluid is applied to the water wheel structure 11, the water wheel structure 11 rotates, which causes rotation and/or oscillation of the cam 65 and the projecting member 75 such that the connector structure 89 rotates the shaft 87, which rotates the tool 41.

Figure 7:
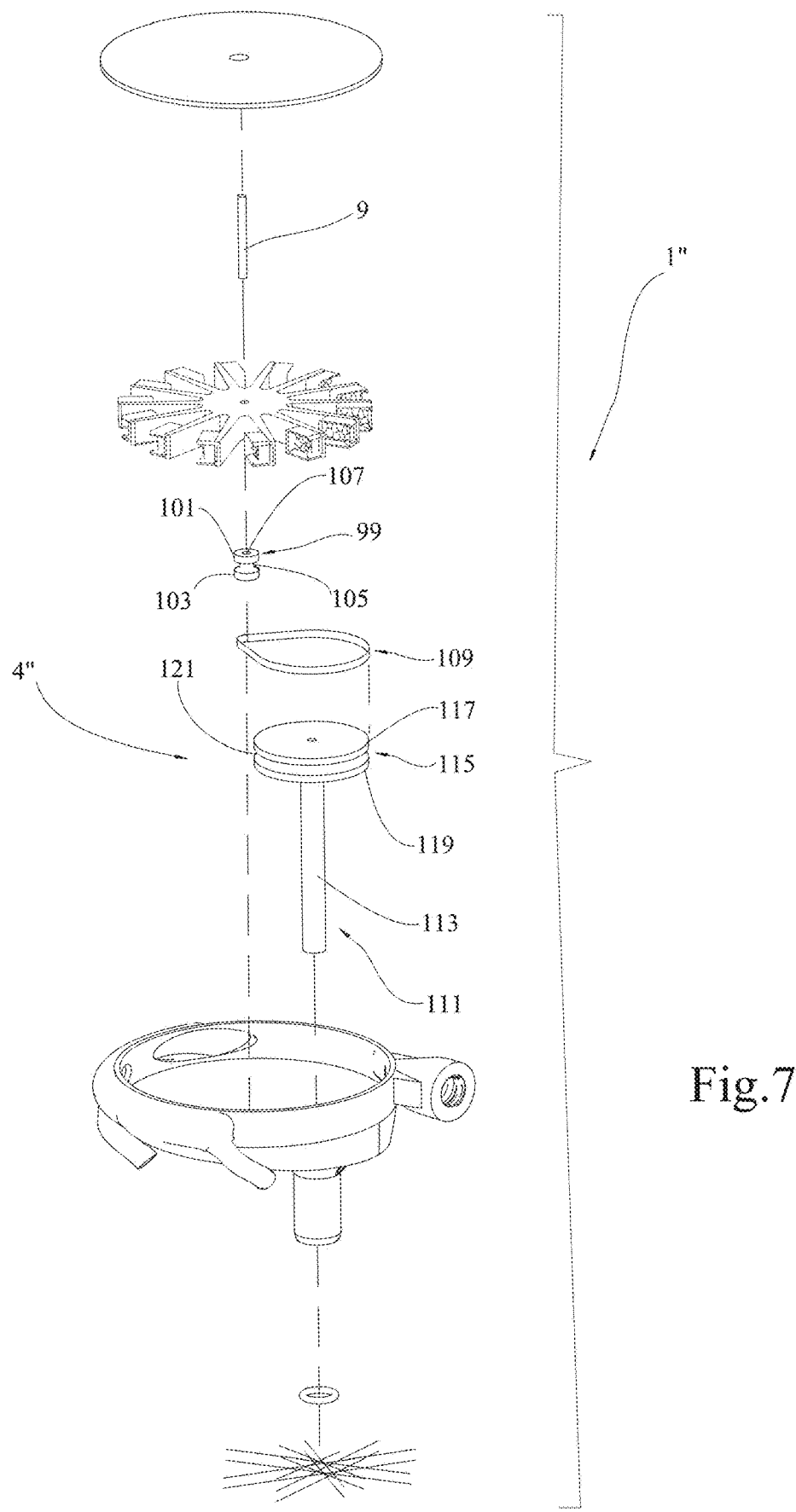
FIG. 7 is an exploded view of a fluid flow actuated tool having a different actuating mechanism than the fluid flow actuated tool shown in FIG. 1 and FIG. 6.

FIG. 7 is an exploded view of another embodiment of a fluid flow actuated tool 1". The fluid flow actuated tool 1" is exactly the same as the fluid flow actuated tool 1, but the fluid flow actuated tool 1" has an actuating mechanism 4" that is different from the actuating mechanism 4 of the fluid flow actuated tool 1. Accordingly, the same reference characters are used to designate the same features shown in the previous embodiment. In order to avoid repetition, only the differences between the actuating mechanism 4 and the actuating mechanism 4" will be discussed.

Instead of using the gears 29, 33 and the cam arrangement in the previous embodiments, the actuating mechanism 4" includes a transmission member 99, a transmission band 109 and a tool transmission member 115. The transmission member 99 is fixed to the water wheel structure 11 and/or the shaft 9. The transmission member 99 includes a first portion 101 and a second portion 103. An annular slot 105 is provided between the first portion 101 and the second portion 103 (the annular slot 105 may be defined by the first portion 101 and the second portion 103). A tool connecting structure 111 is connected to the tool transmission member 115. The tool connecting structure 111 includes a shaft 113. The tool transmission member 115 includes a tool transmission member first portion 117 and a tool transmission member second portion 119. An annular recess 121 is provided between the tool transmission member first portion 117 and the tool transmission member second portion 119

(the tool transmission member first portion 117 and the tool transmission member second portion 119 may define the annular recess 121). At least a portion of the transmission band 109 is arranged in the annular recess 105 and the annular recess 121 such that the transmission band 109 is connected to the transmission member 99 and the tool transmission member 115. When the flow of fluid is applied to the water wheel structure 11, the water wheel structure 11 rotates, which causes rotation of the shaft 9 and the transmission member 99 and the tool transmission member 115 such that the shaft 113 rotates, which causes rotation of the tool 41.

Figure 8:
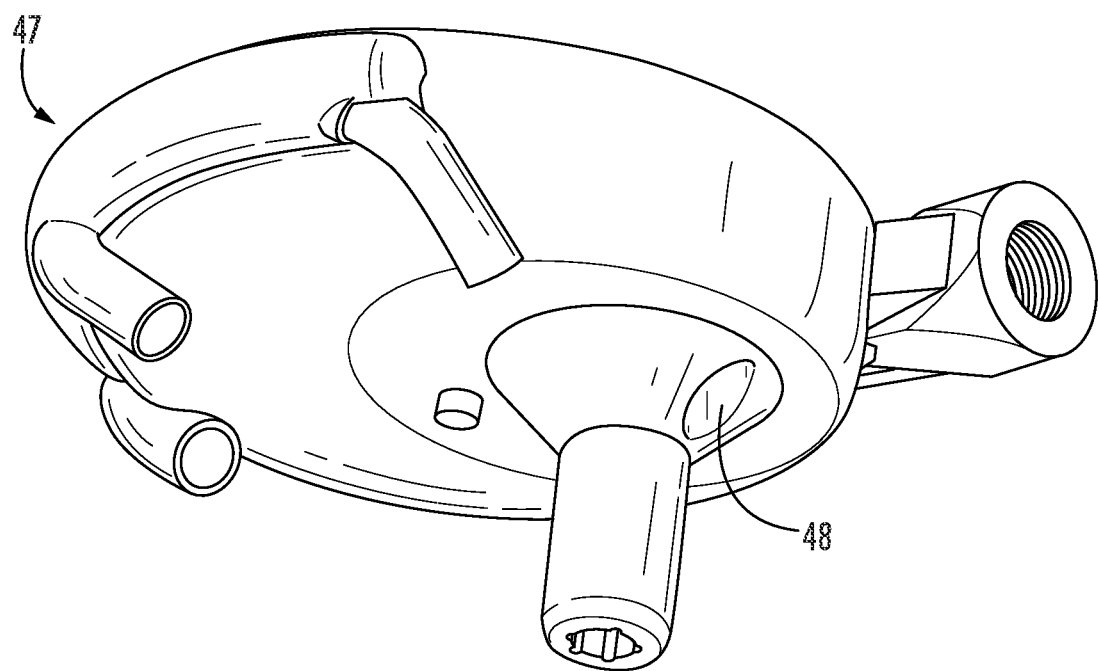
FIG. 8 is a side perspective view of a housing of the actuating tool of FIG. 1, FIG. 6 and FIG. 7.

FIG. 8 is a side perspective view of the housing 47 with the housing cover 3 connected to the housing 47.

Figure 9:
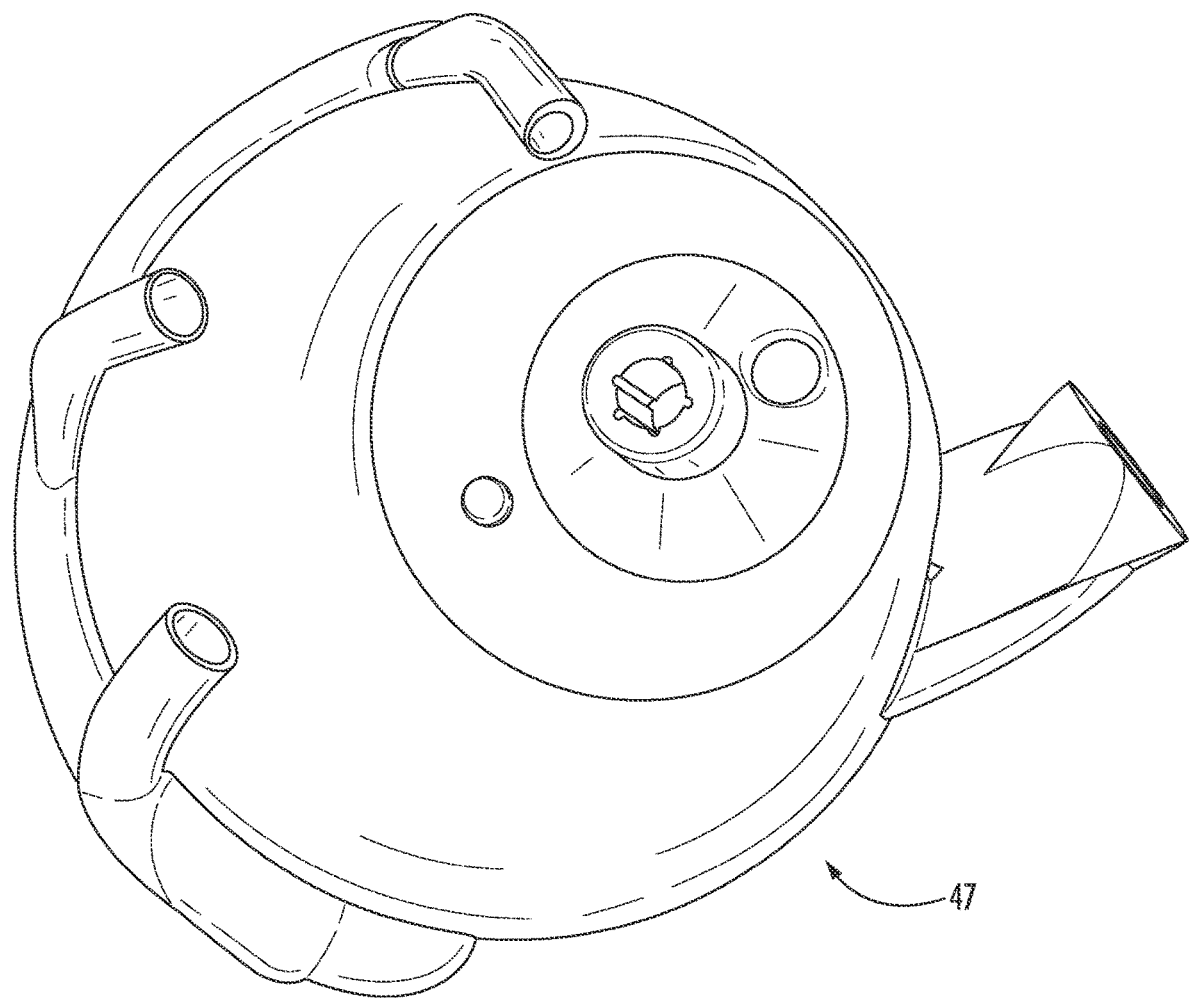
FIG. 9 is a bottom perspective view of the housing of FIG. 8.

FIG. 9 is a bottom perspective view of the housing 47 of FIG. 8.

FIG. 10 is a view of the fluid flow actuated tool 1, 1', 1" shown in FIG. 1, FIG. 6 and FIG. 7 applied to a wheel 125 of a vehicle. The wheel 125 includes a tire rim 125. In this case, at least water is supplied as the fluid to the interior of the housing 47 such that the tool 41 rotates to clean the wheel 125. A flow of water exits the housing via the opening 48 and one or more of the housing fluid guide members 57, 59, 61.

FIG. 11 is a perspective view of the fluid flow actuated tool 1, 1', 1" shown in FIG. 1, FIG. 6 and FIG. 7 connected to a fluid (water) supply 129, which is a water faucet 130 of a sink, via the fluid supply line 127 to clean a piece of houseware 131, which in this case is a cup 133. A flow of water exits the housing via the opening 48 and one or more of the housing fluid guide members 57, 59, 61.

Figure 12:
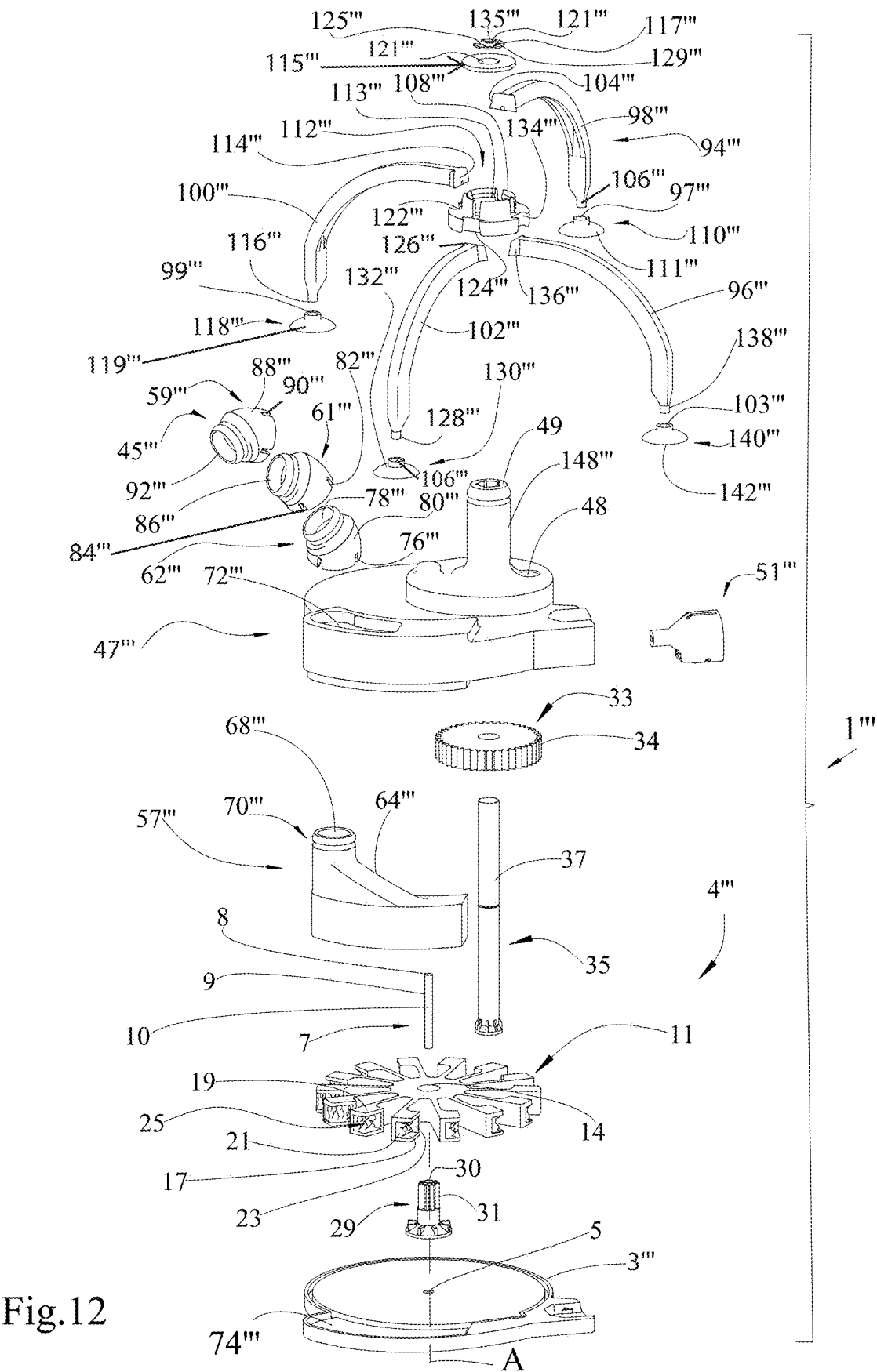
FIG. 12 is an exploded view of another embodiment of a fluid flow actuated tool.

FIG. 12 is an exploded view of a fluid flow actuated tool 1'''. The fluid flow actuated tool 1''' includes the housing cover 3''' and an actuating mechanism 4'''. The housing cover 3''' has the opening 5. The actuating mechanism 4''' includes the water wheel and gear mounting member 7 that is connected to the housing cover 3'''. The water wheel and gear mounting member 7 includes the shaft 9. The end portion 8 of the shaft 9 is inserted in the opening 5. The actuating mechanism 4''' includes the water wheel structure 11 that is connected to the shaft 9. The water wheel structure 11 has the same features as previously discussed in the other embodiments. The actuating mechanism 4''' includes the gear 29 that is connected to the shaft 9. The gear 29 has the opening 30 and the plurality of gear teeth 31. The gear 29 is connected to the water wheel structure 11. At least a portion of the shaft 9 extends through the opening 30 to connect the shaft 9 to the gear 29.

The actuating mechanism 4''' includes the gear 33 having the gear teeth 34 that engage the gear teeth 31 of the gear 29. The tool connecting structure 35 is connected to the gear 33. One end of the tool connecting structure 35 may be welded to the gear 33 or connected to the gear 33 by any other suitable connection. The tool connecting structure 35 is shown in the form of the shaft 37. The shaft 37 is connected to a tool, which is not shown, but may be similar to the tool 41 shown in the previous embodiment, which may be in the form of the brush 43 that has a plurality of brush projecting members (brush bristles) 45, but may be any other tool, such as but not limited to a screw driver, a drill bit, a clamping member, etc.

The shaft 37 extends through the opening 49 in a housing 47'''. The housing cover 3''' is detachably connected to the housing 47'''. Another end portion 10 of the shaft 9''' is connected to the housing 47'''. The shaft 9, the water wheel structure 11, the gear 29 and the gear 33 are located in an interior space of the housing 47''' defined by the housing 47''' and the housing cover 3''' when the housing cover 3''' is connected to the housing 47'''. The housing 47''' has the housing opening 48 that is located at a radially spaced location from the shaft 37. At least a portion of the shaft 37 is located outside of the housing interior and a seal member 39 is arranged in the opening 49 to seal a space between the shaft 37 and the housing 47'''. The shaft 37 is located at a radially offset position from the longitudinal (center) axis of the fluid flow actuated tool 1'''.

The housing 47''' includes a housing connector 51''' for connecting the housing 47''' to the fluid supply line 127 such that the housing 47''' receives a flow of fluid. The housing connector 51''' is detachably connected to the housing 47'''. The housing connector 51''' includes a housing connector opening 53''', an opening 54''' and a plurality of threads 55''', which define at least a portion of the housing connector opening 53''', for connecting to the fluid supply line 127. The housing connector opening 53''' is located opposite the opening 54'''. The housing connector opening 53''' has a diameter that is greater than a diameter of the opening 54'''. The housing connector 51''' defines a nozzle such that a velocity of fluid entering the housing connector opening 53''' is less than a velocity of the fluid exiting the opening 54'''. The housing connector 51''' is arranged in a space 56'''. Although threads 55''' are shown for connecting the housing 47''' to the fluid supply line 127, it is understood that any other suitable connection may be used, such as a snap connection or a plug connection. One or more of the fluid engaging structures 15 and at least a portion of one or more of the water wheel members 13 are arranged in a path of expected flow of fluid prior to the flow of fluid entering the interior space of the housing 47'''. When the flow of fluid engages the fluid engaging material 25, the water wheel structure 11 rotates such that each of the fluid engaging structures 15 and at least a portion of each water wheel members 13 enters the path of the flow of fluid so that the water wheel structure 11 rotates as long as the fluid is supplied to the interior of the housing 47'''. The water wheel structure 11 and the gear 29 are fixed to the shaft 9. The wheel structure 11 and the gear 29 may be connected by any suitable means to the shaft 9, including using epoxy to connect the wheel structure 11 and the gear 29 to the shaft 9. The wheel structure 11 and the gear 29 may be integrally connected to the shaft 9 to form a one-piece structure, which may be done by molding or 3-D printing or any other suitable process. Rotation of the water wheel structure 11 via the flow of fluid causes the shaft 9 to rotate, which causes the gear 29 and the gear 34 to rotate such that the shaft 37 rotates, which causes the tool 41 to rotate. In another embodiment, a bearing may be connected to the water wheel structure 11 and the shaft 9 and another bearing may be connected to the shaft 9 and the gear 29 such that the shaft 9 remains in a fixed position as the water wheel structure 11, the gear 29 and the gear 34 rotate relative to the shaft 9.

When fluid enters the interior of the housing 47''', the fluid flows out of the housing via the opening 48 and housing fluid guide members 57''', 59''', 61''', 62'''. The housing fluid guide members 57''', 59''', 61''', 62" are connected to each other to define a fluid flow path for fluid to flow from the interior space of the housing 47''' to an environment outside of the housing 47'''. The housing fluid guide member 57''' has a housing 64''' having an opening 66''' and an opening 68'''. The housing fluid guide member 57''' is inserted into a recess 74''' of the housing cover 3'''. A portion 70''' of the housing fluid guide member 57''' extends through an opening 72''' in the housing 47''' such that the portion of 70''' of the housing fluid guide member 57''' is located at a position outside of the interior space of the housing 47'''. The housing fluid guide member 62''' has a housing 80''' that has an opening 76''' and an opening 78'''. The housing fluid guide member 61''' has a housing 82''' having an opening 84''' and an opening 86'''. The housing fluid guide member 59''' has a housing 88''' that has an opening 90''' and opening 92'''. The housing fluid guide member 62''' is rotatably connected to the housing fluid guide member 57'''. Each of the housing fluid guide members 59''', 61''' and 62''' are connected to each other and are rotatable relative to the housing fluid guide member 57''', which allows the housing fluid guide members 59''', 61''' and 62''' to be rotated 360 degrees to form a rotatable nozzle 45'''.

A mounting structure 94''' is connected to the housing 47'''. The mounting structure 94''' includes a connector element 112''', legs 96''', 98''', 100''' and 102'''. Although four legs are shown, it is understood that any number of legs greater than two may be provided. The connector element 112''' has an opening 113''' and recesses 108''', 122''', 124''' and 134'''. Although four recesses are shown, it is understood that any number of recesses may be provided such that the number of recesses equal the number of legs. The leg 98''' has a connector 104''' and a connector 106'''. The connector 106''' is inserted in an opening 97''' of a mounting element 110'''. The mounting element 110''' is shown in the form of a suction cup element 111'''. The connector 104''' is inserted into the recess 108'''. The leg 100''' has a connector 114''' and a connector 116'''. The connector 116''' is inserted in an opening 99''' of a mounting element 118'''. The mounting element 118''' is shown in the form of a suction cup element 119'''. The connector 114''' is inserted into the recess 122'''. The leg 102''' has a connector 126''' and a connector 128'''. The connector 128''' is inserted in an opening 101''' of a mounting element 130'''. The mounting element 130''' is shown in the form of a suction cup element 132'''. The connector 126''' is inserted into the recess 124'''. The leg 96''' has a connector 136''' and a connector 138'''. The connector 138''' is inserted in an opening 103''' of a mounting element 140'''. The mounting element 140''' is shown in the form of a suction cup element 142'''. The connector 136''' is inserted into the recess 134'''. Although four mounting elements are shown, any number greater than two mounting elements may be provided such that the number of mounting elements is equal to the number of legs.

A portion 148''' of the housing 47''' extends through the opening 113''' of the connector element 112'''. A washer 115''' is connected to the connector element 112''' and a fixing element 117'''. The washer 115''' has an opening 121''' through which the portion 148''' of the housing 47''' extends. The fixing element 117''' has projecting portions 125''', 129''' and 135''' that engage the portion 148''' of the housing 47''' to fix the connector element 112''' in position such that the connector element 112''' does not move relative to the housing 47'''.

Figure 21:
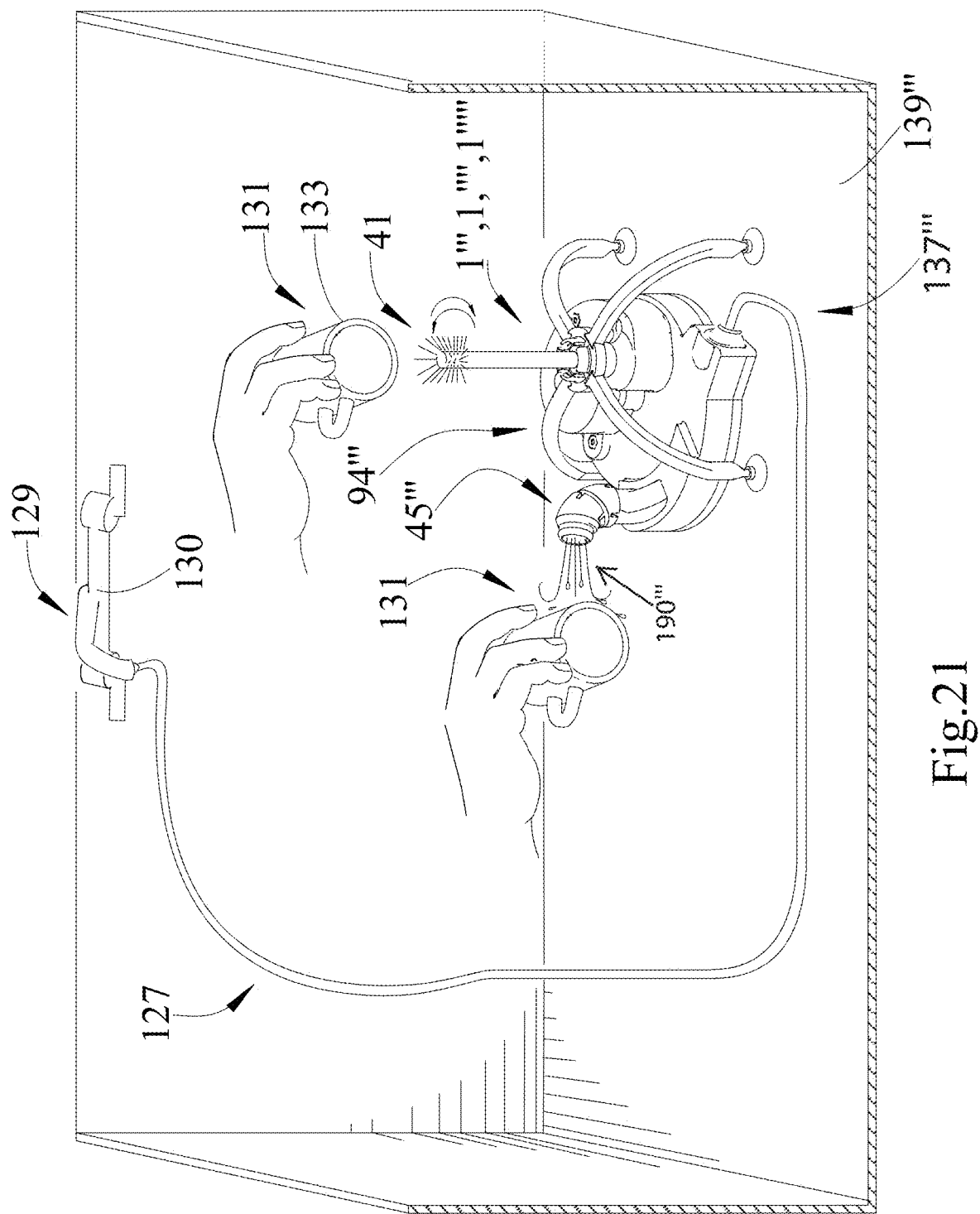
FIG. 21 is a view of a fluid flow actuated tool connected to a fluid supply line and a fluid supply.
Figure 22:
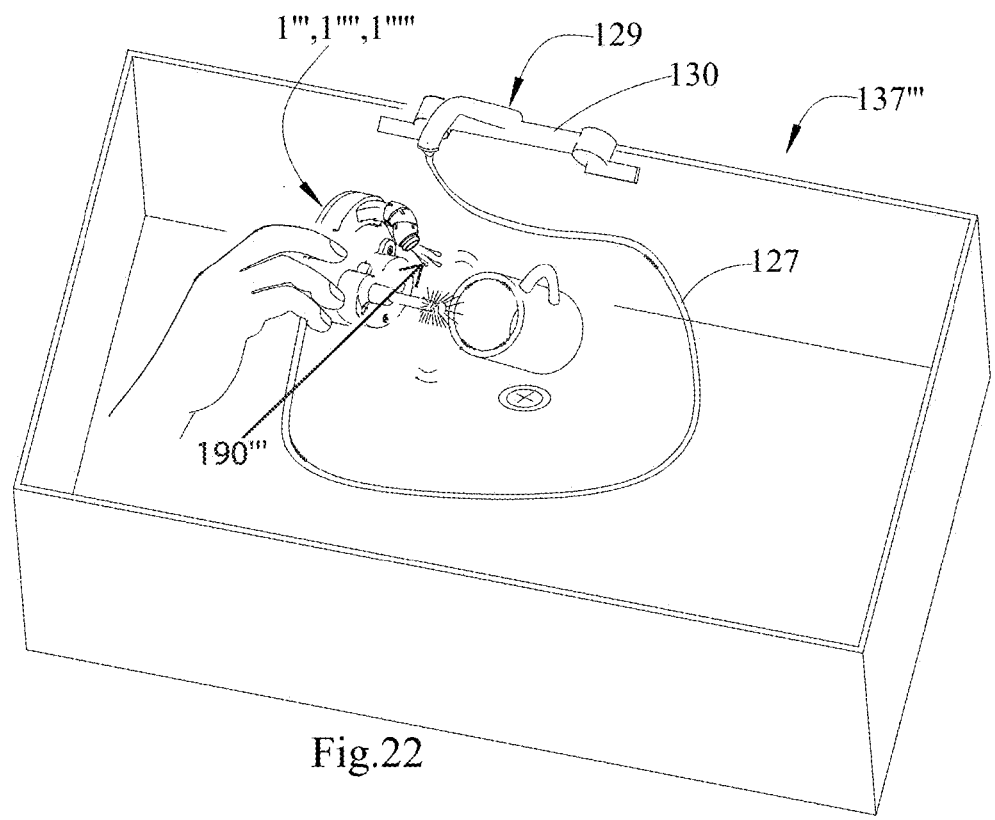
FIG. 22 is a view of a fluid flow actuated tool connected to the fluid supply line and the fluid supply.
Figure 23:
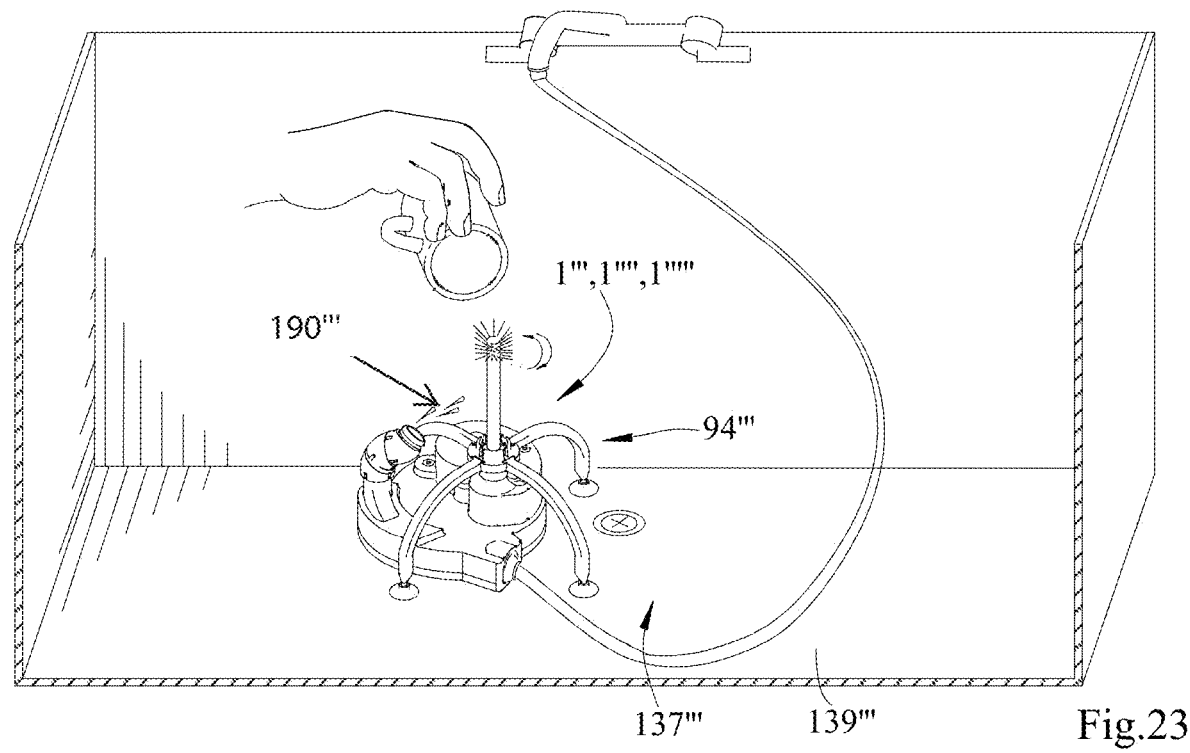
FIG. 23 is a view of a fluid flow actuated tool connected to the fluid supply line and the fluid supply.

The mounting structure 94''' fixes the fluid flow actuating tool 1''' to a surface 139''' such as a surface of a sink 137''' (see FIGS. 21-23). The suction cup elements 111''', 119''', 132''', 142''' engage the surface 139'''. Although the mounting structure 94''' is shown connected to the fluid flow actuating tool 1''', it is understood that the mounting structure 94''' can be used to fix the fluid flow actuating tool 1 or the fluid flow actuating tool 1" or any other embodiment of the fluid flow actuating tool to the surface 139'''.

Figure 13:
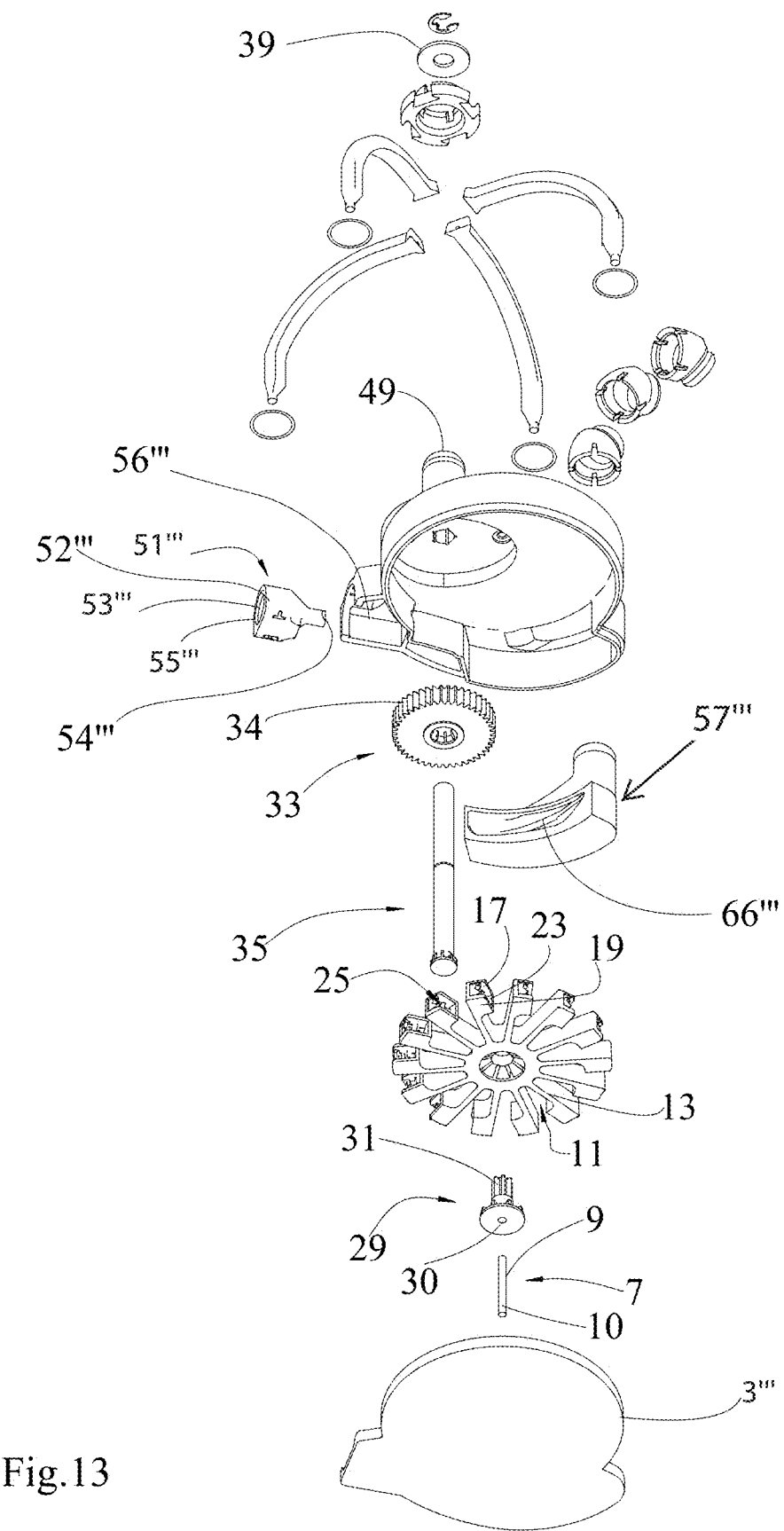
FIG. 13 is another exploded view of the fluid flow actuating tool of FIG. 12.

FIG. 13 is another exploded view of the fluid flow actuating tool 1'''.

Figure 14:
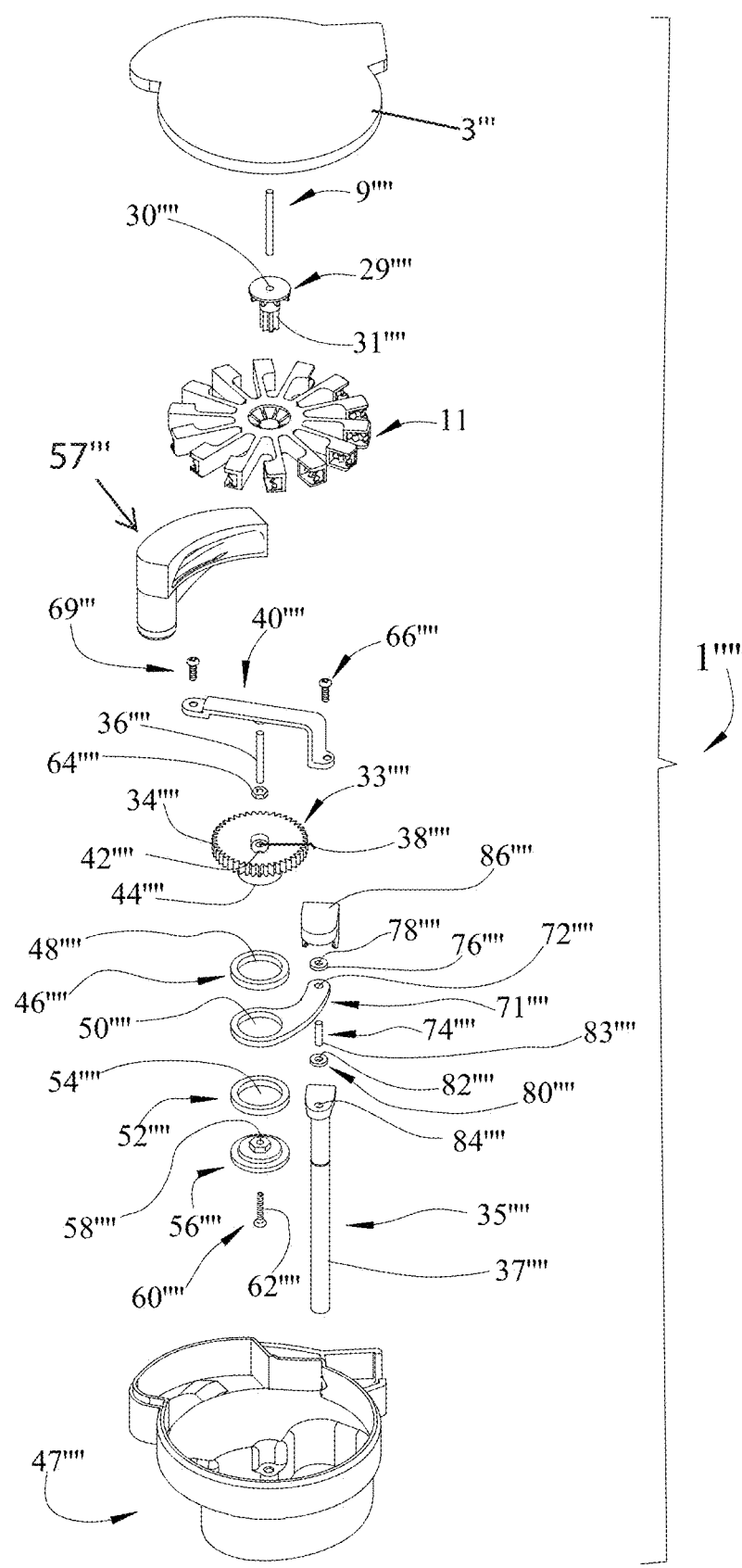
FIG. 14 is an exploded view of another embodiment of a fluid flow actuated tool.

FIG. 14 is an exploded view of another embodiment of a fluid flow actuated tool 1''''. The fluid flow actuated tool 1'''' is exactly the same as the fluid flow actuated tool 1''', but the fluid flow actuated tool 1'''' has an actuating mechanism 4'''' that is different from the actuating mechanism 4''' of the fluid flow actuated tool 1. Accordingly, the same reference characters are used to designate the same features shown in the previous embodiments. In order to avoid repetition, only the differences between the actuating mechanism 4''' and the actuating mechanism 4'''' will be discussed.

The actuating mechanism 4'''' includes a gear 29'''' that is connected to a shaft 9''''. The gear 29'''' has an opening 30'''' and a plurality of gear teeth 31''''. The gear 29''' is connected to the water wheel structure 11, which has the same features as previously discussed above. At least a portion of the shaft 9'''' extends through the opening 30'''' to connect the shaft 9'''' to the gear 29''''. The actuating mechanism 4'''' includes a gear 33'''' having gear teeth 34'''' that engage the gear teeth 31'''' of the gear 29'''. A tool connecting structure 35'''' is connected to the gear 33'''' by a transmission connecting member 71''''. The tool connecting structure 35'''' is shown in the form of a shaft 37''''. The shaft 37'''' is connected to a tool, which is not shown, but may be similar to the tool 41 shown in the previous embodiment, which may be in the form of the brush 43 that has a plurality of brush projecting members (brush bristles) 45, but may be any other tool, such as but not limited to a screw driver, a drill bit, a clamping member, etc.

The gear 33'''' is connected to a shaft 36''''. The shaft 36'''' extends through an opening 38'''' in the gear 33''''. The shaft 36'''' is connected to a housing 47'''' and a fixed member 40'''' such that the gear 33'''' rotates relative to the fixed member 40'''' and the housing 47''''. The fixed member 40'''' is fixed to the housing 47'''' via fasteners 64'''', 69'''', which are shown in the form of screws, but may be pins, rivets or any other suitable connecting structure. The gear 33'''' includes another opening 42''''. The gear 33'''' has a gear projecting portion 44''''. An annular member 46'''' is provided between the gear 33'''' and the transmission connecting member 71''''. The annular member 46'''' has an opening 48''''. The transmission connecting member 71'''' has an opening 50''''. A fixing member 56'''' is connected to the transmission connecting member 71'''' and the gear 33''''. The fixing member 56'''' has an opening 58'''' and has an annular shape. An annular member 52'''' is provided between the fixing member 56'''' and the transmission connecting member 71''''. The fastening member 60'''', which may be in the form of a screw 62'''', extends through the opening 58'''' of the fixing member 56'''' and the opening 42'''' of the gear 33'''' wherein the fastening member 60'''' is connected to a nut element 64'''' such that the fixing member 56'''', the annular member 50'''', the transmission connecting member 71'''' and the annular member 46'''' are connected to the gear 33''''. The transmission connecting member 71'''' includes an opening 72''''. A portion of a pin 74'''' extends through the opening 72'''' such that the pin 74'''' is connected to a tool connecting structure member 86'''' and the tool connecting structure 35''''. The tool connecting structure 35'''' includes a recess 84''''. An end portion 83'''' of the pin 74'''' is arranged in the recess 84''''. An annular member 76'''' is arranged between the transmission connecting member 71'''' and the tool connecting structure member 86''''. The annular member 76'''' has an opening 78'''' through which the pin 74'''' passes. An annular member 80'''' is provided between the transmission connecting member 71'''' and the tool connecting structure 35''''. The annular member 80'''' has an opening 82'''' through which the pin 74'''' passes. When fluid actuates the water wheel structure 11, the gear 29'''' rotates, which causes the gear 33'''' to rotate, which in turn causes the transmission connecting member 71"" to rotate such that the tool connecting structure 35"" rotates, which rotates the tool.

Figure 15:
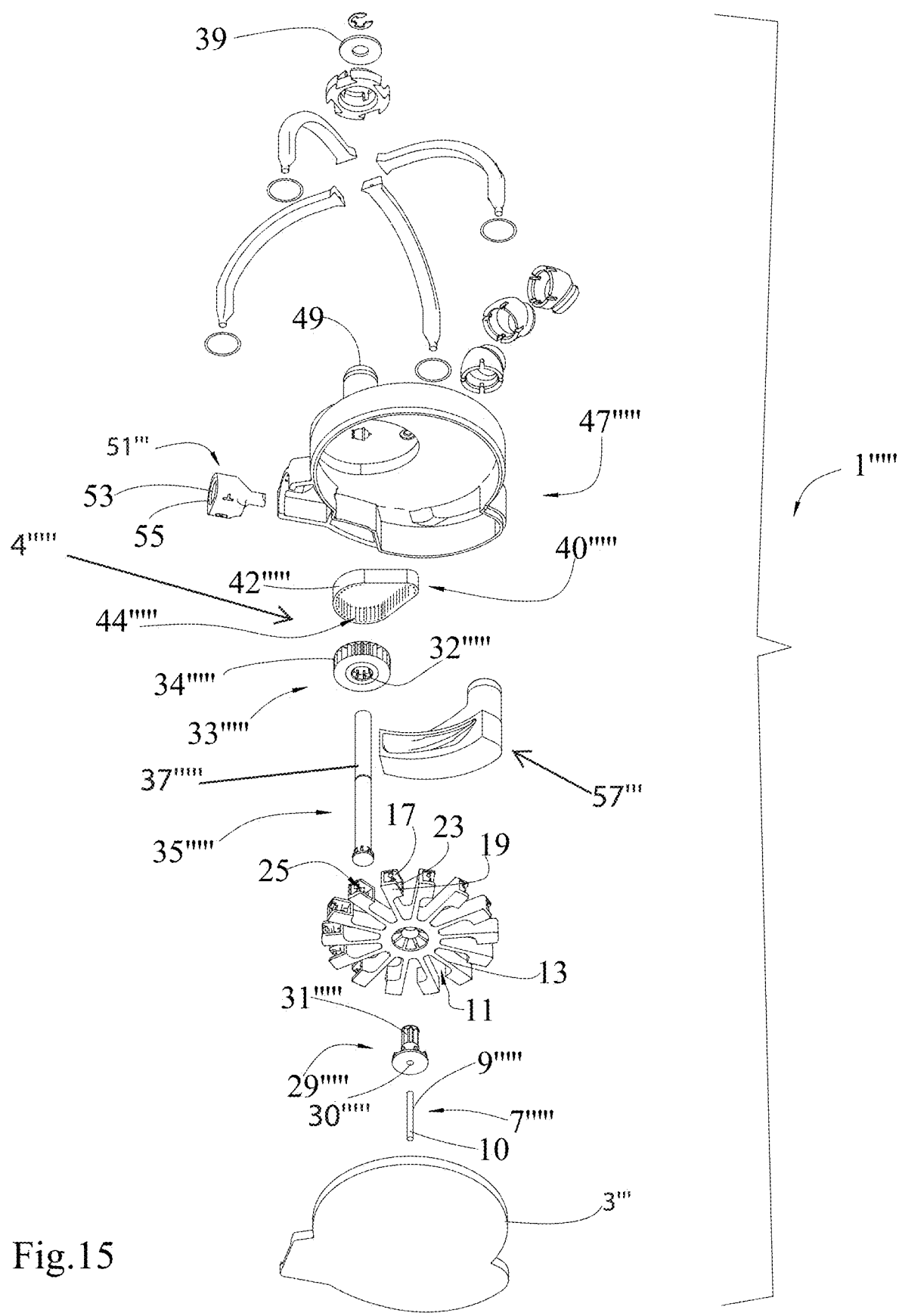
FIG. 15 is an exploded view of another embodiment of a fluid flow actuated tool.

FIG. 15 is an exploded view of another embodiment of a fluid flow actuated tool 1""". The fluid flow actuated tool 1""" is exactly the same as the fluid flow actuated tool 1''' and the fluid flow actuated tool 1"", but the fluid flow actuated tool 1""" has an actuating mechanism 4""" that is different from the actuating mechanism 4''' of the fluid flow actuated tool 1''' and the actuating mechanism 4"" of the fluid flow actuated tool 1"". In order to avoid repetition, only the differences between the actuating mechanism 4""" and the actuating mechanisms 4''', 4"" will be discussed.

As shown in FIG. 15, the actuating mechanism 4""" includes a gear 29""" that is connected to a shaft 9""". An end portion 10""" is connected to the housing cover 3'''. Another end portion 8""" is connected to housing 47""". The gear 29""" has an opening 30""" and a plurality of gear teeth 31""". The gear 29""" is connected to the water wheel structure 11, which has the same features as previously discussed above. At least a portion of the shaft 9""" extends through the opening 30""" to connect the shaft 9""" to the gear 29""". The actuating mechanism 4""" includes a gear 33""" having gear teeth 34""" that engage the gear teeth 31""" of the gear 29""". The gear 33""" has an opening 32""". A tool connecting structure 35""" is connected to the gear 33""". The tool connecting structure 35""" is shown in the form of a shaft 37""". A portion of the shaft 37""" extends through the opening 32""". The shaft 37""" is connected to a tool, which is not shown, but may be similar to the tool 41 shown in the previous embodiment, which may be in the form of the brush 43 that has a plurality of brush projecting members (brush bristles) 45, but may be any other tool, such as but not limited to a screw driver, a drill bit, a clamping member, etc.

The gear 33""" is connected to a transmission member 40""", which may be in the form of a belt 42""". The transmission member 40""" has projections 44""". The projections engage the gear teeth 31""" of the gear 29""" and the gear teeth 34""" of the gear 33""". When fluid actuates the water wheel structure 11 to cause rotation of the water wheel structure 11, the gear 29""" rotates, which causes the gear 33""" to rotate due to the gear 29""" being connected to the gear 33""" via the transmission member 40""", which in turn causes the tool connecting structure 35""" to rotate, which rotates the tool.

Figure 16:
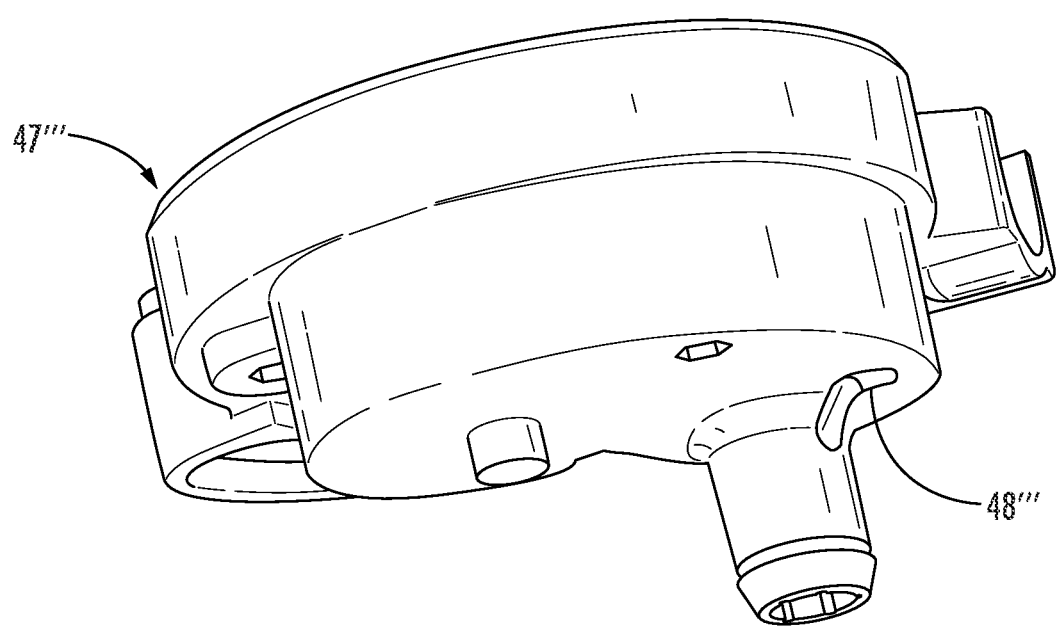
FIG. 16 is a side perspective view of a housing associated with a fluid actuating tool.

FIG. 16 is a side perspective view of the housing 47''' with the housing cover 3''' connected to the housing 47'''.

Figure 17:
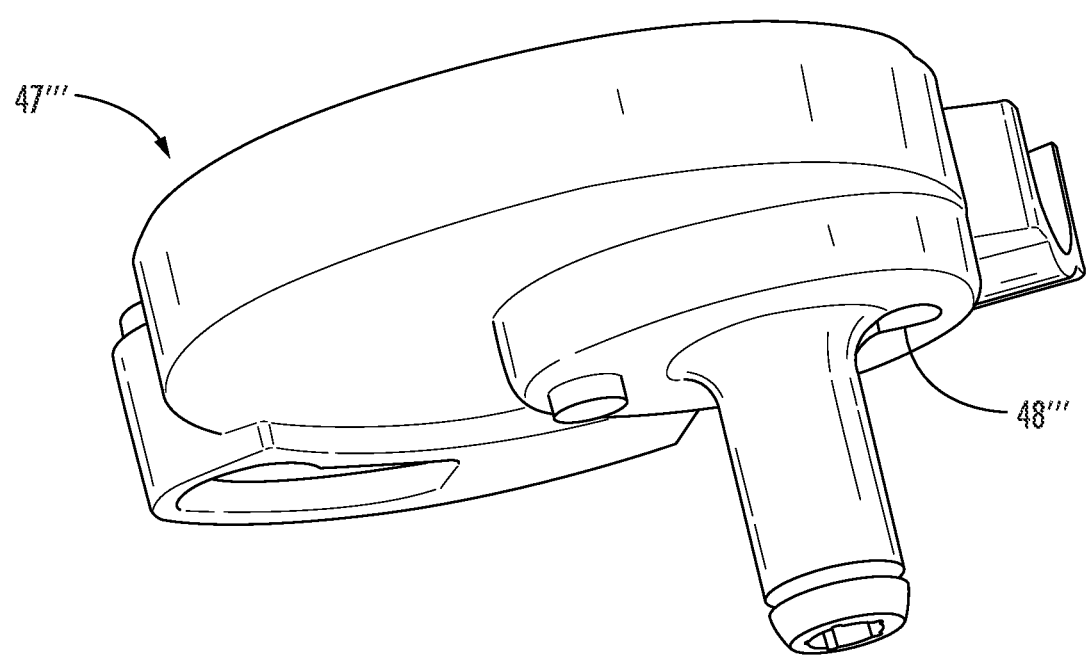
FIG. 17 is a bottom perspective view of the housing of FIG. 16.

FIG. 17 is a bottom perspective view of the housing 47''' of FIG. 16.

Figure 18:
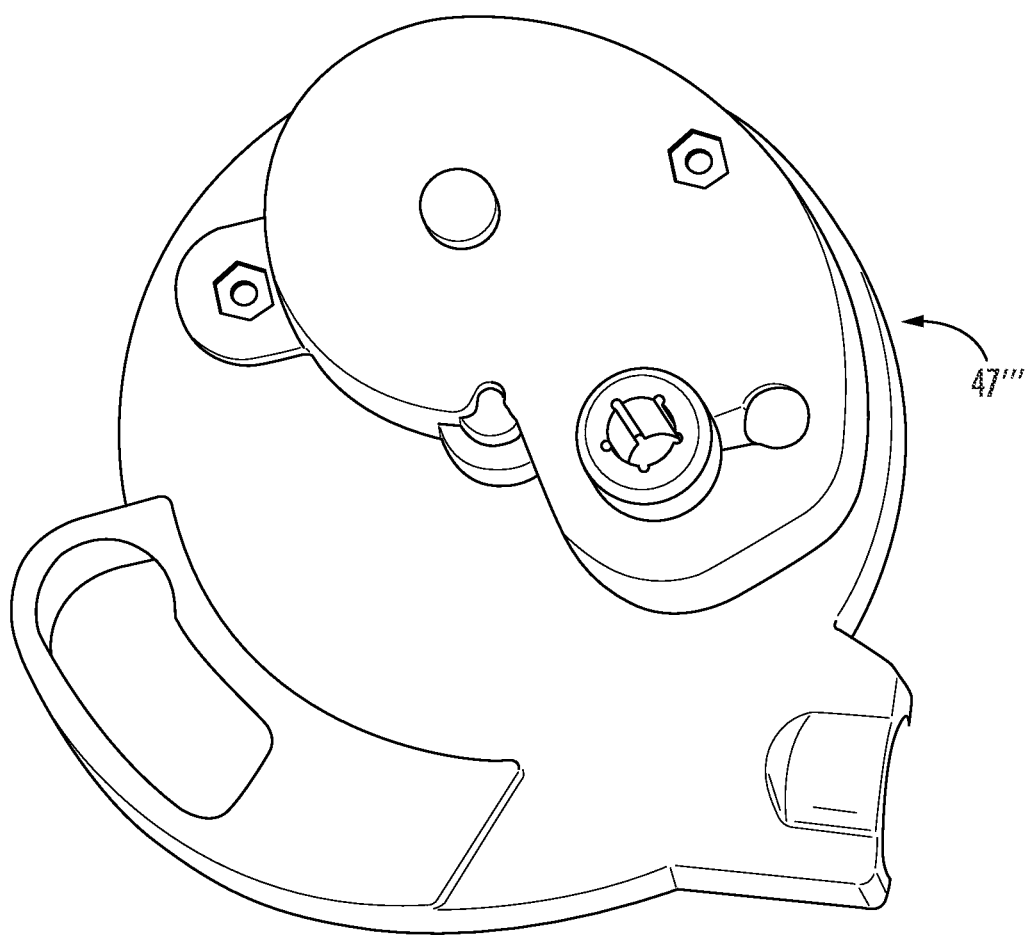
FIG. 18 is a bottom view of the housing of FIG. 16.

FIG. 18 is a bottom view of the housing 47''' of FIG. 16.

Figure 19:
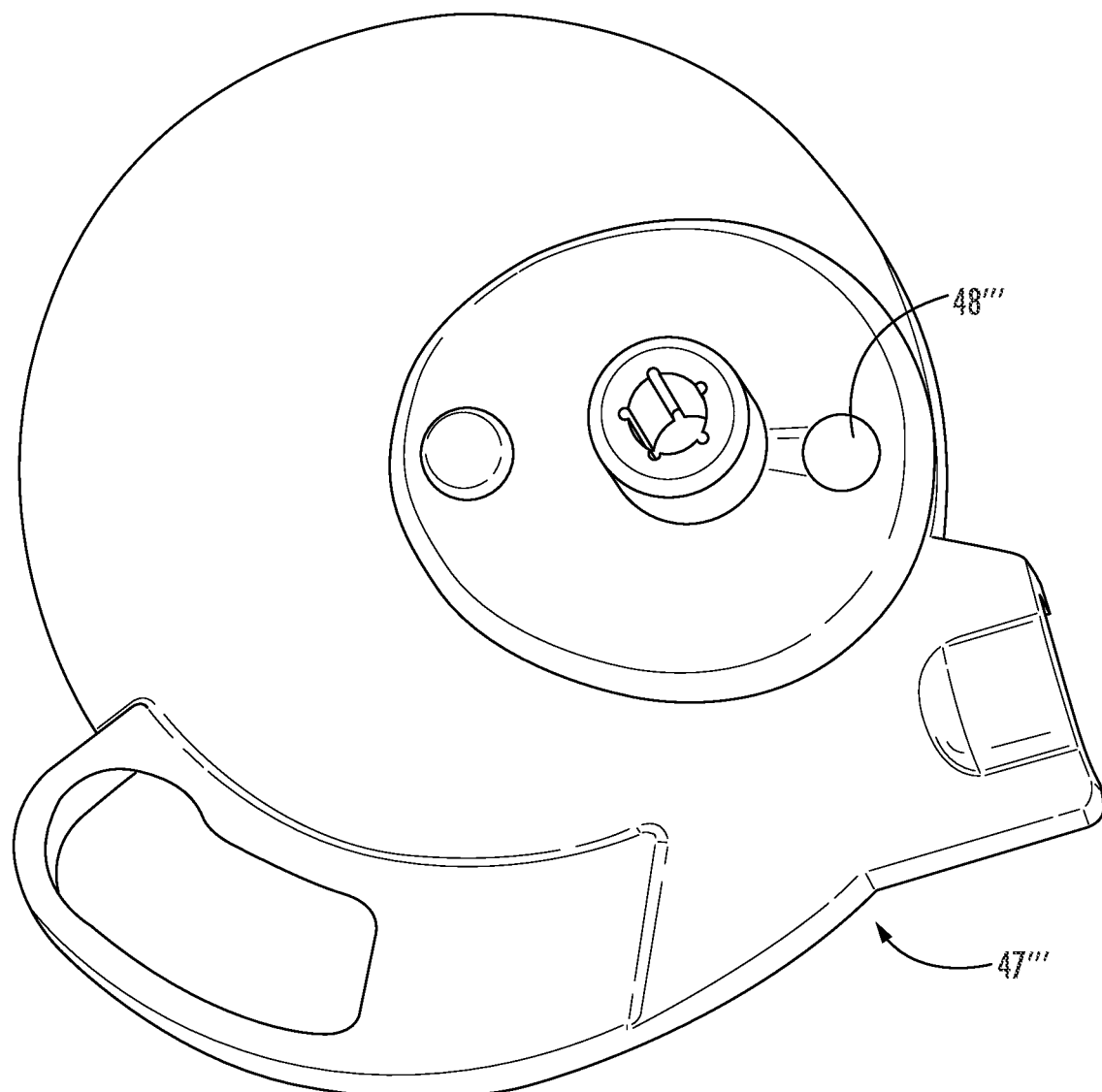
FIG. 19 is another bottom view of the housing of FIG. 16.

FIG. 19 is another bottom view of the housing 47''' of FIG. 16.

Figure 20:
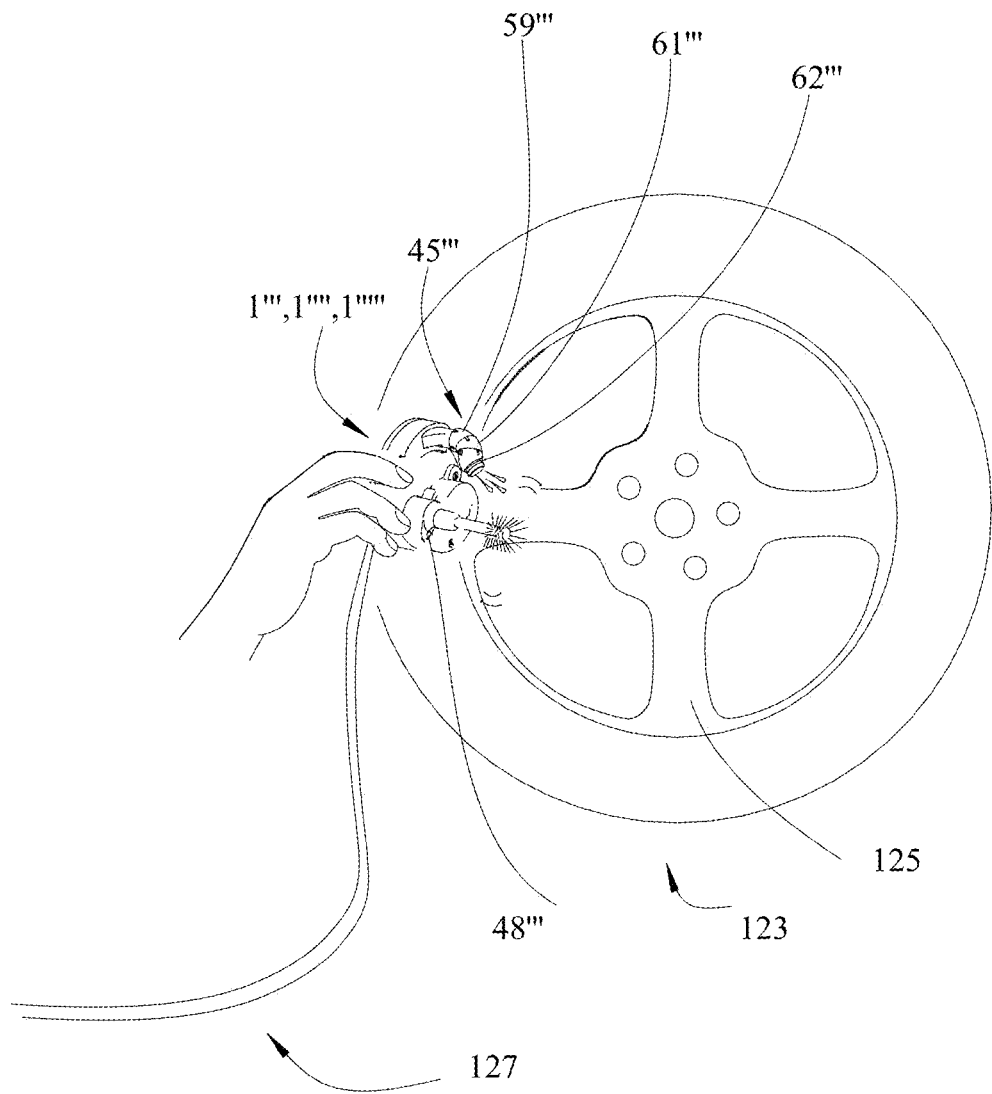
FIG. 20 is a view of a fluid flow actuated tool applied to a wheel of a vehicle.

FIG. 20 is a view of the fluid flow actuated tool 1''', 1"", 1""" shown in FIG. 12, FIG. 14 and FIG. 15 applied to the wheel 123 of a vehicle. In this case, at least water is supplied as the fluid to the interior of the water wheel structure 11 such that the tool 41 rotates to clean the wheel 125. A flow of water exits the housing via the opening 48''' and the rotatable housing fluid guide members 59''', 61''', 62''', which form the rotatable nozzle 45'''.

FIG. 21 is a view of the fluid flow actuated tool 1''', 1"", 1""" shown in FIG. 12, FIG. 14 and FIG. 15 connected to the fluid supply line 127 and the fluid supply 129, which is the faucet 130. The fluid flow actuated tool 1''', 1"", 1""" is fixed to the surface 139''' of the sink 137''' by the mounting structure 94'''. Fluid, especially water, supplied to the fluid flow actuated tool 1''', 1"", 1""" actuates the water wheel structure 11 to actuate the tool 41, which can be used to clean houseware 131, such as the cup 133. The fluid supplied to the fluid flow actuated tool 1''', 1"", 1""" exits the fluid flow actuated tool 1''', 1"", 1""" via the rotatable nozzle 45''', which provides a stream (flow) of fluid that can be used to clean houseware 131.

FIG. 22 is a view of the fluid flow actuated tool 1''', 1"", 1""" shown in FIG. 12, FIG. 14 and FIG. 15 connected to the fluid supply line 127 and the fluid supply 129, which is the faucet 130. The faucet 130 is connected to the sink 137'''.

FIG. 23 is a view of the fluid flow actuated tool 1''', 1"", 1""" shown in FIG. 12, FIG. 14 and FIG. 15 connected to the fluid supply line 127 and the fluid supply 129, which is the faucet 130. The fluid flow actuated tool 1''', 1"", 1""" is fixed to the surface 139''' of the sink 137''' via the mounting structure 94'''. Fluid, especially water, supplied to the fluid flow actuated tool 1''', 1"", 1""" actuates the water wheel structure 11 to actuate the tool 41, which can be used to clean houseware 131, such as the cup 133. The fluid supplied to the fluid flow actuated tool 1''', 1"", 1""" exits the fluid flow actuated tool 1''', 1"", 1""" via the rotatable nozzle 45''', which provides a stream (flow) of fluid 190''' that can be used to clean houseware 131.

Figure 24:
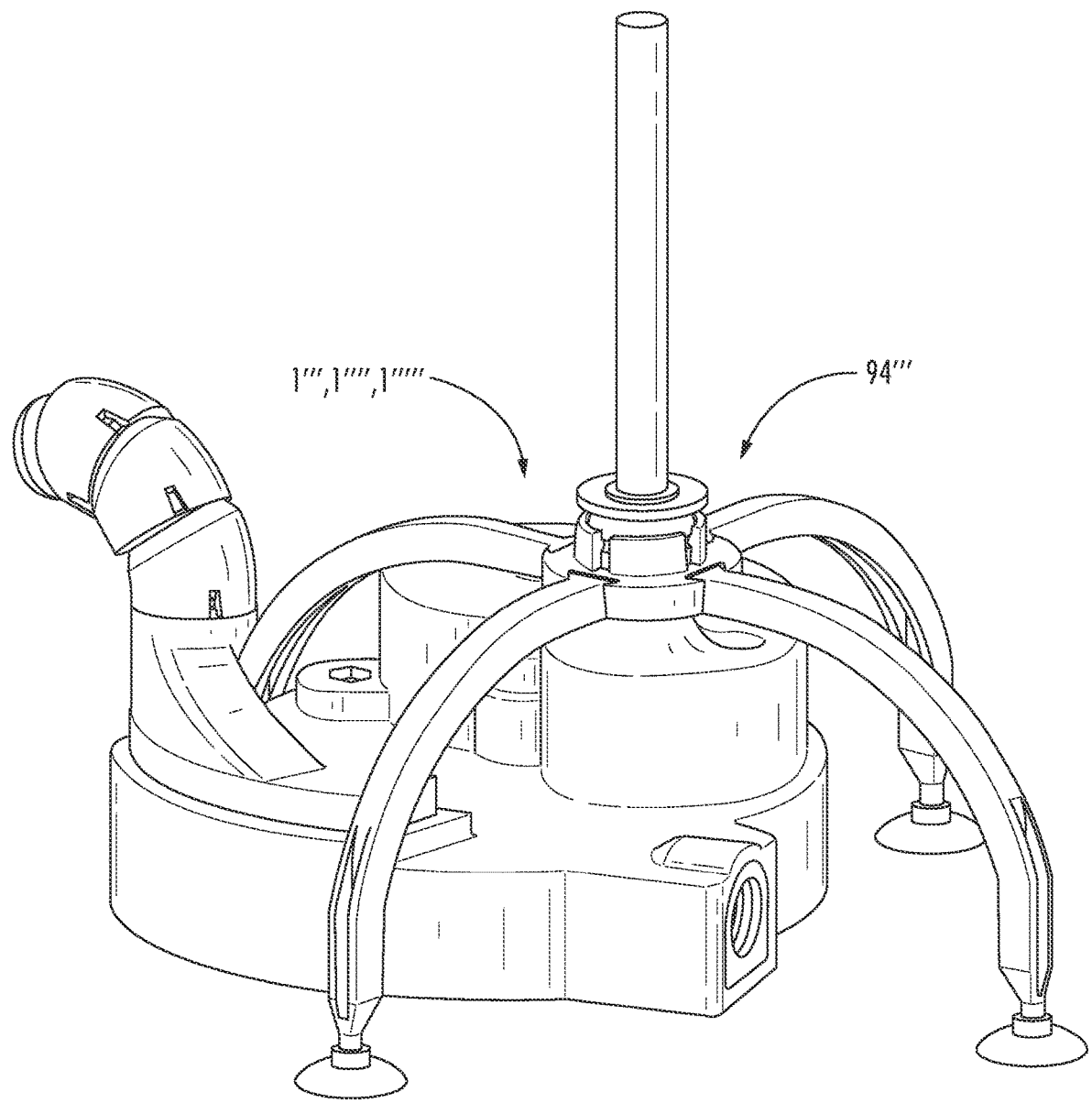
FIG. 24 is a perspective view of a fluid flow actuated tool connected to a mounting structure.

FIG. 24 is a perspective view of the fluid flow actuated tool 1''', 1"", 1""" that is connected to the mounting structure 94'''.

FIG. 25a is a top view of the fluid guide member 57'''.

FIG. 25b is a front perspective view of the fluid guide member 57''' of FIG. 25a.

FIG. 25c is a rear perspective view of the fluid guide member 57''' of FIG. 25a.

FIG. 26 is a cross sectional view of the fluid guide member 57''' taken along line 26-26 of FIG. 25.

FIG. 27 is a cross sectional view of the fluid guide member 57''' taken along line 27-27 of FIG. 25.

FIG. 28 is a cross sectional view of the fluid guide member 57''' taken along line 28-28 of FIG. 25.

FIG. 29 is another top view of the fluid guide member 57'''.

FIG. 30 is a cross sectional view of the fluid guide member 57''' taken along line 30-30 of FIG. 29.

FIG. 31 is a cross sectional view of the fluid guide member 57''' taken along line 31-31 of FIG. 29.

FIG. 32 is a cross sectional view of the fluid guide member 57''' taken along line 32-32 of FIG. 29.

FIG. 33 is a cross sectional view of the fluid guide member 57''' taken along line 33-33 of FIG. 29. The fluid guide member 57''' has an inner fluid guiding surface 170''' that guides fluid toward the opening 68'''. As shown in FIGS. 25a, 26, 27, 28, 29, 30, 31, 32 and 33, the inner fluid guiding surface 170''' has a radial slope RS''' that increases in a radial direction R''' from one side 172''' of the fluid guide member 57''' to another side 174''' of the fluid guide member 57''' in the radial direction R''' as shown in FIGS. 26, 27 and 28. This provides the inner fluid guiding surface 170''' with a radial slope RS''' in the radial direction R''' that is greatest adjacent to the side 174''' of the fluid guide member 57'''. The radial slope RS''' forms an arcuate surface that is follows a curved contour C''' of a periphery of the housing 64''' of the fluid guide member 57'''. The inner fluid guiding surface 170''' has an axial slope AS''' that increases in an axial direction A''' from one end 176''' of the fluid guide member 57''' to another end 178''' of the fluid guide member 57''' as shown in FIGS. 25a, 30, 31, 32 and 33. A portion 180''' of the inner fluid guiding surface 170''' is perpendicular to the axial direction A'''.

Figure 34:
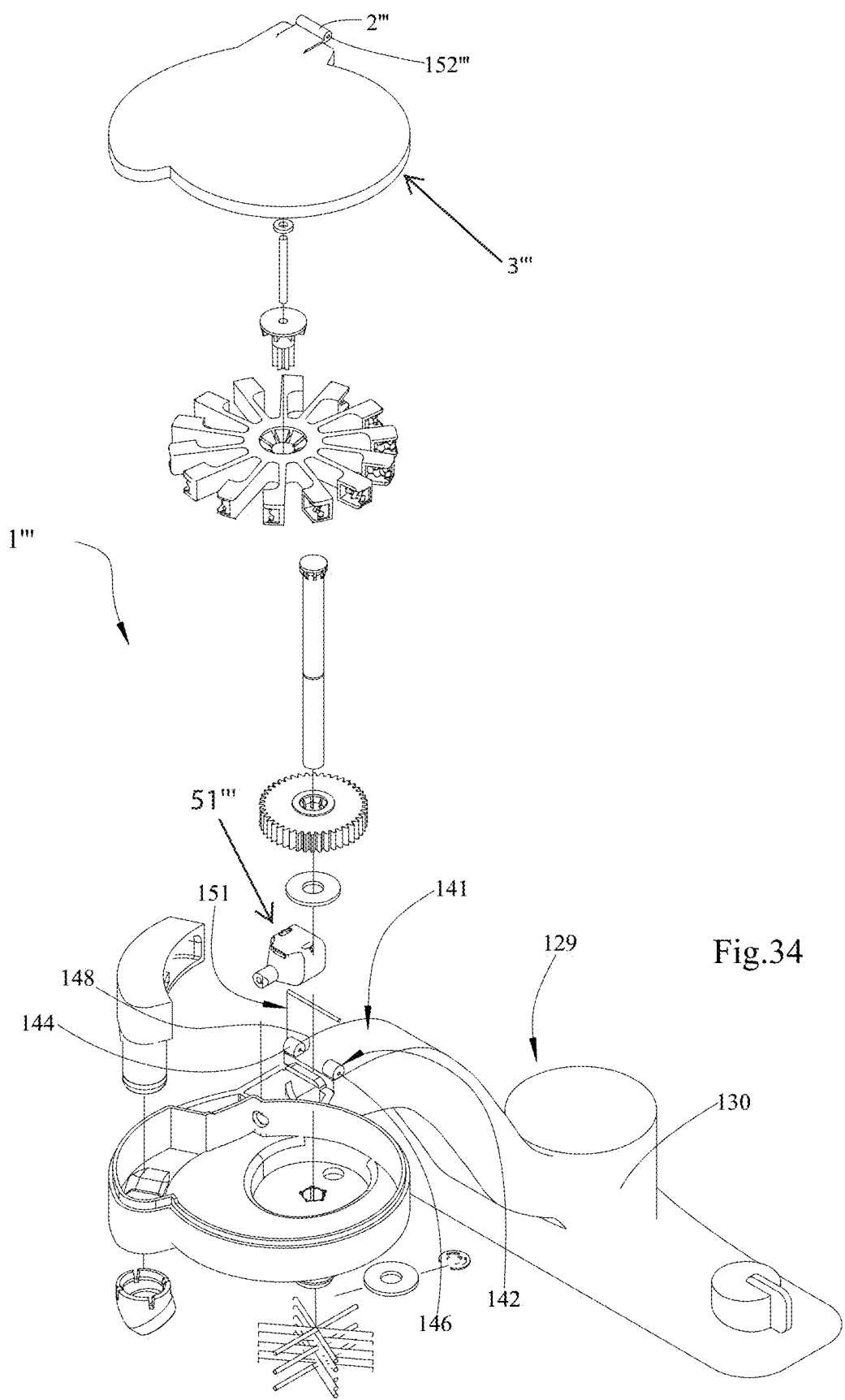
FIG. 34 is an exploded view of a fluid flow actuated tool that forms a part of a water delivery device.

FIG. 34 is an exploded view of the fluid flow actuated tool 1''' connected directly to the fluid supply 129, which is the faucet 130. The housing cover 3''' is connected to a fluid delivery member 141 of the faucet 130. The housing cover 3''' includes a housing cover portion 2''' that has an opening 152'''. The delivery member 141 of the faucet 130 has members 142, 144. The member 142 has an opening 146. The member 144 has an opening 148. The fluid deliver member 141 defines a portion of a flow path for delivering fluid, particularly water, to the water wheel structure 11 of the fluid flow actuated tool 1'''. A pin 151 extends through the opening 148 of the member 144, the opening 152''' of the housing cover portion 2''' and the opening 146 of the member 142 such that the housing cover 2''' can pivot between an open position and a closed position. In the open position of the housing cover 3''', the water wheel structure 11 and the other components in the interior of the fluid actuating tool 1''' can be accessed by a user. It is understood that the fluid actuating tools 1, 1', 1", 1''' and 1'''' can also be connected to the faucet 130 in the same manner.

Figure 35:
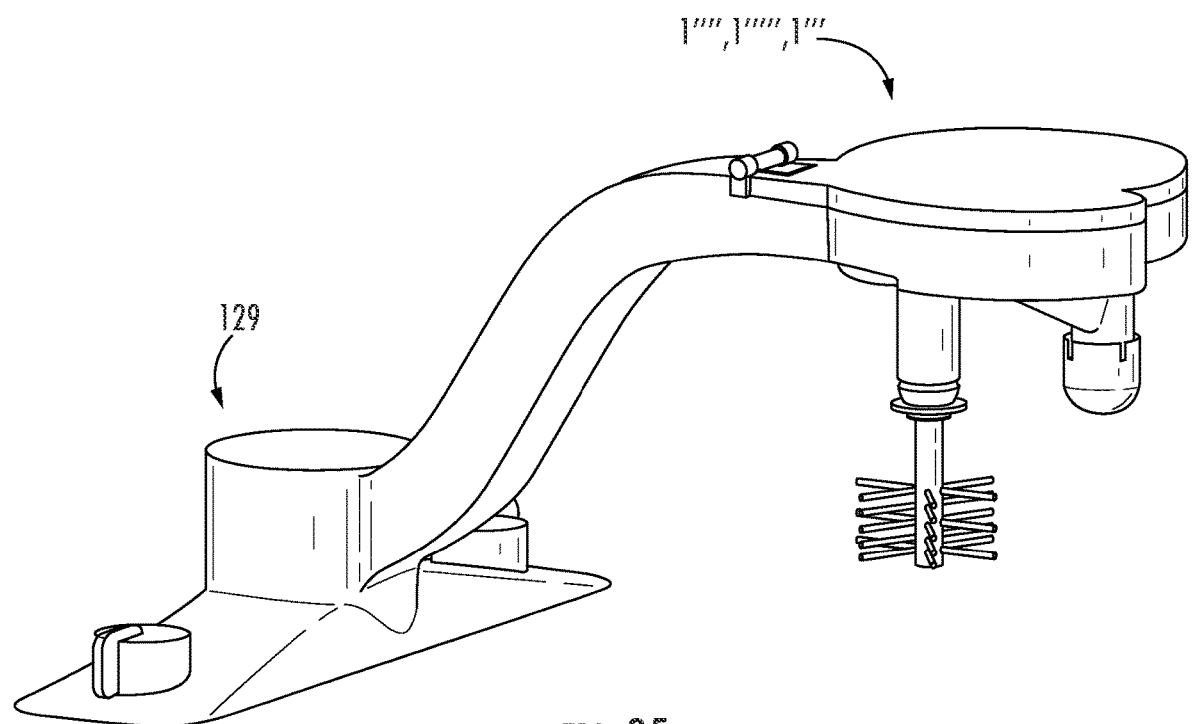
FIG. 35 is a perspective view of a fluid flow actuated tool that forms a part of a water delivery device.

FIG. 35 is a perspective view of the fluid flow actuated tool 1''' connected to the faucet 130 with the housing cover 2''' in the closed position.

Figure 36:
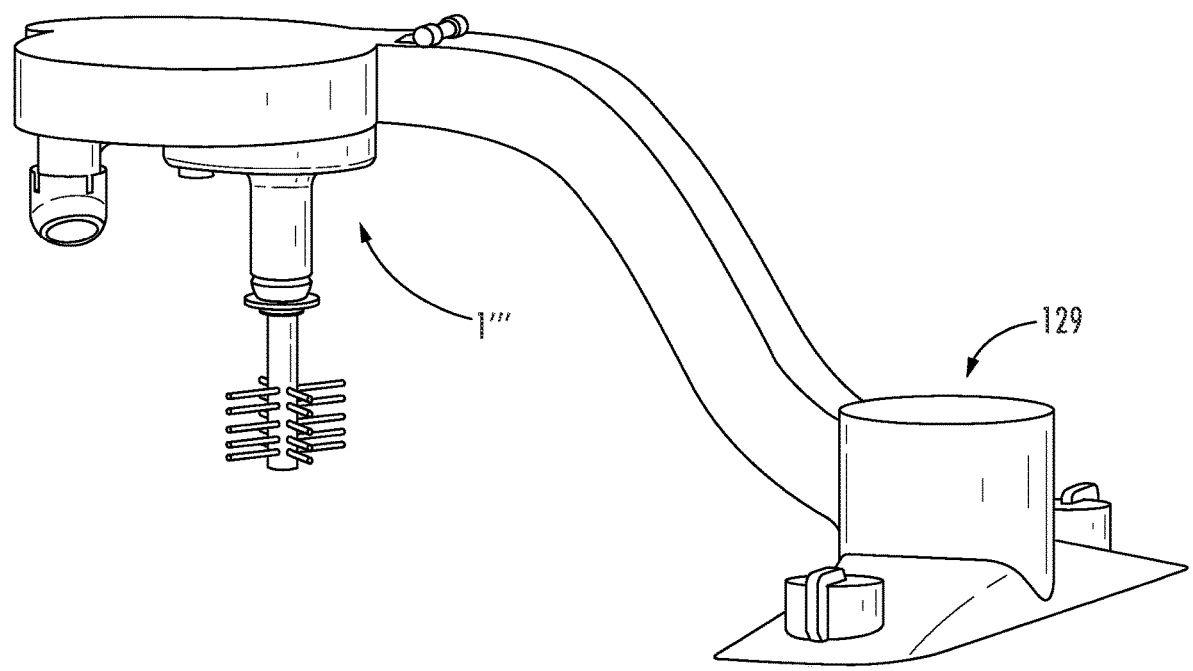
FIG. 36 is a perspective view of the fluid flow actuated tool that forms a part of the water delivery device of FIG. 34.

FIG. 36 is a perspective view of the fluid flow actuated tool 1''' connected to the faucet 130 with the housing cover 2''' in the closed position.

While specific embodiments of the invention have been shown and described in detail to illustrate the application of the principles of the invention, it will be understood that the invention may be embodied otherwise without departing from such principles.

What is claimed is:

1. A fluid flow actuated tool, comprising:
   a housing comprising a housing interior, said housing interior receiving a flow of fluid;
   a tool; and
   an actuating mechanism comprising a fluid wheel structure, said fluid wheel structure being connected to said tool, at least a portion of said fluid wheel structure being arranged in said flow of fluid for rotating said fluid wheel structure, wherein said tool is actuated based on rotation of said fluid wheel structure, said fluid wheel structure comprising a plurality of fluid engaging structures, each of said fluid engaging structures comprising fluid engaging material, said fluid engaging material comprising a plurality of raised fluid engaging portions for engaging said flow of fluid, said fluid wheel structure comprising a plurality of radially extending portions, each of said radially extending portions comprising an end portion, said end portion comprising one of said fluid engaging structures.

2. A fluid flow actuated tool in accordance with claim 1, wherein said one of said fluid engaging structures defines a surface comprising a plurality of elevated areas.

3. A fluid flow actuated tool in accordance with claim 2, wherein said surface comprises a plurality of non-elevated areas, each of said non-elevated areas being defined between one of said elevated areas and another one of said elevated areas.

4. A fluid flow actuated tool in accordance with claim 1, wherein each of said fluid engaging structures comprises a first portion and a second portion extending in a radial direction with respect to a longitudinal axis of said fluid wheel structure, each of said fluid engaging structures further comprising a third portion and a fourth portion extending in an axial direction with respect to said longitudinal axis of said fluid wheel structure, said first portion being parallel to said second portion, said third portion being parallel to said fourth portion, each of said plurality of raised fluid engaging structures being arranged between said first portion, said second portion, said third portion and said fourth portion.

5. A fluid flow actuated tool in accordance with claim 1, wherein said tool comprises a tool shaft, said housing comprising a tool shaft receiving opening, at least a portion of said tool shaft being arranged in said tool shaft receiving opening.

6. A fluid flow actuated tool in accordance with claim 5, wherein said housing comprises a housing fluid guide member having an opening located adjacent to said tool shaft, wherein said housing fluid guide member conveys fluid from said interior of said housing to an environment external to said housing via said opening.

7. A fluid flow actuated tool in accordance with claim 6, wherein said housing comprises a nozzle, wherein fluid exits said housing via said nozzle.

8. A fluid flow actuated tool in accordance with claim 6, wherein said housing comprises another opening located at a radially spaced location from said tool shaft, wherein said fluid flows from said interior of said housing to said environment external to said housing via said opening.

9. A fluid flow actuated tool in accordance with claim 8, wherein said housing comprises a housing connector for connecting said housing to a fluid supply line for supplying said flow of fluid to said interior of said housing.

10. A fluid flow actuated tool in accordance with claim 1, wherein said housing is connected to a fluid delivery device, wherein said housing forms an outlet of said fluid delivery device.

11. A fluid flow actuated tool in accordance with claim 10, wherein said housing forms a portion of said fluid delivery device.

12. A fluid flow actuated tool in accordance with claim 10, wherein said housing comprises a housing cover, said housing cover being pivotably connected to said fluid delivery device.

13. A fluid flow actuated tool in accordance with claim 1, further comprising:
   a fluid guide member for guiding at least a portion of said flow of fluid, said fluid guide member comprising an inner fluid guiding surface having a radial slope, said radial slope increasing in a radial direction from a first side of said fluid guide member to a second side of said fluid guide member with respect to a longitudinal axis of said fluid guide member.

14. A fluid flow actuated tool in accordance with claim 13, wherein said inner fluid guiding surface comprises an axial slope, said axial slope increasing in an axial direction from a third side of said fluid guide member to a fourth side of said fluid guide member.

15. A fluid flow actuated tool in accordance with claim 13, further comprising:
   a nozzle connected to said housing, said fluid guide member being arranged in said interior of said housing and said fluid member being configured to guide said portion of said flow of fluid in a direction of said nozzle.

* * * * *